(12) United States Patent
Dew et al.

(10) Patent No.: US 10,915,089 B2
(45) Date of Patent: *Feb. 9, 2021

(54) SYSTEM FOR OPTIMIZING THE EXECUTION OF PARAMETRIC JOINERY FOR SOLID WOOD PRODUCTS

(71) Applicant: Michael Weinig, Inc., Mooresville, NC (US)

(72) Inventors: Daniel Dew, Mooresville, NC (US); Jason F. Howell, Mooresville, NC (US)

(73) Assignee: MICHAEL WEINIG, INC., Mooresville, NC (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/229,874

(22) Filed: Dec. 21, 2018

(65) Prior Publication Data

US 2019/0121321 A1 Apr. 25, 2019

Related U.S. Application Data

(63) Continuation of application No. 15/223,599, filed on Jul. 29, 2016, now Pat. No. 10,197,990.

(60) Provisional application No. 62/200,011, filed on Aug. 1, 2015.

(51) Int. Cl.
*G05B 19/4097* (2006.01)
*G05B 15/02* (2006.01)

(52) U.S. Cl.
CPC ......... *G05B 19/4097* (2013.01); *G05B 15/02* (2013.01); *G05B 2219/32035* (2013.01); *G05B 2219/32036* (2013.01); *G05B 2219/34038* (2013.01); *G05B 2219/35012* (2013.01); *G05B 2219/35198* (2013.01); *G05B 2219/45205* (2013.01); *G05B 2219/45229* (2013.01)

(58) Field of Classification Search
CPC ..................... G06Q 10/06; G05B 2219/32107
USPC ........................................... 700/97
See application file for complete search history.

(56) References Cited

U.S. PATENT DOCUMENTS

| 4,248,282 A * | 2/1981 | Waldron .............. B23Q 35/102 |
| | | 144/144.1 |
| 5,293,479 A | 3/1994 | Quintero et al. |
| 7,107,119 B2 | 9/2006 | Geissdörfer et al. |
| 7,761,183 B2 | 7/2010 | Sullivan |

(Continued)

OTHER PUBLICATIONS

International Search Report and Written Opinion for PCT/US2016/044808 dated Oct. 7, 2016.

(Continued)

*Primary Examiner* — Suresh Suryawanshi
(74) *Attorney, Agent, or Firm* — Patrick B. Horne; Shumaker, Loop & Kendrick, LLP

(57) ABSTRACT

Embodiments of the invention are directed to systems, methods, and computer program products for optimizing the manufacture of wooden furniture. The system is configured to receive a user selection of a furniture product; receive a user input associated with the one or more variables for each of the one or more components of the furniture product; generate a furniture plan for the one or more components associated with the at least one of the one or more furniture products; and transmit control signals based on the furniture plan to cause a manufacturing equipment to implement the furniture plan, wherein implementing the furniture plan further comprises manufacturing the one or more components.

17 Claims, 16 Drawing Sheets

(56) References Cited

U.S. PATENT DOCUMENTS

| | | | |
|---|---|---|---|
| 7,997,308 B2 | 8/2011 | Stepp | |
| 8,156,973 B2* | 4/2012 | Stepp | B27F 1/08 |
| | | | 144/136.1 |
| 8,356,954 B2 | 1/2013 | Koch | |
| 8,601,433 B2 | 12/2013 | Son et al. | |
| 8,996,150 B1* | 3/2015 | Ambrose | G06F 30/00 |
| | | | 700/97 |
| 9,558,153 B2 | 1/2017 | Howell et al. | |
| 9,785,727 B1 | 10/2017 | Wilson | |
| 2003/0172003 A1 | 9/2003 | Holbrook et al. | |
| 2003/0196726 A1* | 10/2003 | Tucker | B23Q 3/005 |
| | | | 144/372 |
| 2004/0113945 A1 | 6/2004 | Park et al. | |
| 2004/0157188 A1 | 8/2004 | Luth et al. | |
| 2005/0034785 A1 | 2/2005 | Lovchik et al. | |
| 2005/0056345 A1 | 3/2005 | Duginske | |
| 2009/0089174 A1 | 4/2009 | Brunner et al. | |
| 2009/0188584 A1 | 7/2009 | Stepp | |
| 2009/0326694 A1* | 12/2009 | Stephens | G06F 30/00 |
| | | | 700/98 |
| 2012/0237291 A1 | 9/2012 | Friesen | |
| 2014/0058549 A1 | 2/2014 | Howell et al. | |
| 2014/0225996 A1 | 8/2014 | Neal | |
| 2015/0064391 A1 | 3/2015 | Trondl | |
| 2016/0070255 A1 | 3/2016 | Loberg | |
| 2016/0103447 A1 | 4/2016 | Sinn et al. | |
| 2016/0327931 A1 | 11/2016 | Gu et al. | |

OTHER PUBLICATIONS

International Preliminary Report on Patentability for PCT/US2016/044808 dated Feb. 15, 2018.

* cited by examiner

RECEIVING, AT A CHOP-SAW, BOM INFORMATION FROM THE MANUFACTURING CONTROL SYSTEM AND PERFORMING CUTS
212

↓

PREPARING INDIVIDUAL (I.E., "CLEAN") STAVES FOR A COMPONENT USING A RIPSAW AND PERFORMING CUTS
214

↓

MATCHING COLOR AND/OR GRAIN OF STAVES AND SORTING THEM INTO COMPONENT COLLECTIONS
216

↓

RECEIVING BOM INFORMATION FROM THE MANUFACTURING CONTROL SYSTEM AT A LABEL STATION OF THE RIPSAW AND PRINTING AND APPLYING LABELS FOR EACH COMPONENT, THE LABELS CORRESPONDING TO ONE OR MORE MACHINE CODE PROGRAMS (E.G., A G-CODE PROGRAM FOR A 5-AXIS ROUTER)
218

↓

GLUING-UP COMPONENTS, WHERE LABEL REMAINS ACCESSIBLE
220

↓

SANDING THE GLUED-UP COMPONENTS, WHERE LABEL REMAINS ACCESSIBLE
222

↓

SCANNING LABEL, THEREBY ACTIVATING CORRESPONDING ONE OR MORE MACHINE CODE PROGRAMS (E.G., ACTIVATING THE G-CODE PROGRAM ON THE 5-AXIS ROUTER
224

↓

PROCESSING THE COMPONENT BY THE MACHINE (E.G., 5-AXIS ROUTER) USING THE ACTIVATED MACHINE CODE PROGRAM(S) (E.G., G-CODE PROGRAM)
226

SYSTEM FOR OPTIMIZING THE EXECUTION OF PARAMETRIC JOINERY FOR SOLID WOOD PRODUCTS

PRIORITY CLAIM

This application is a continuation of U.S. patent application Ser. No. 15/223,599 entitled "SYSTEM FOR OPTIMIZING THE EXECUTION OF PARAMETRIC JOINERY FOR SOLID WOOD PRODUCTS", filed on Jul. 29, 2016; which claims the benefit of U.S. Provisional Application Ser. No. 62/200,011 entitled "SYSTEM FOR OPTIMIZING THE EXECUTION OF PARAMETRIC JOINERY FOR SOLID WOOD PRODUCTS", filed Aug. 1, 2015, both of which are incorporated herein by reference in their entirety.

BACKGROUND

Generally, there are two primary types of furniture—(1) custom or non-custom solid wood furniture or other solid wood products (collectively referred to herein as "solid wood products") and (2) engineered or manufactured furniture, sheet-goods products/furniture or ready-to-assemble furniture (collectively referred to herein as "sheet-goods products"). Sheet-goods products are often made of layered low quality wood products, plywood, particle board or the like. Manufactured wood pieces, because of their non-homogenized composition, do not enable complex joinery between pieces. Rather, manufactured wood generally utilizes simple joints such as dowel joints that use abutting pieces that are secured using dowels. Often sheet-goods products may be machine assembled because of the relatively simple joints used between furniture pieces. In other use cases, sheet-goods products may be sold as part of a kit with instructions for the end user to assemble the furniture. The types of joints used in this furniture must be simple and easily assembled and include joints such as abutting joints that use dowels.

On the other hand, solid wood products are typically more expensive to design, cut and build and have greater durability, higher quality and better aesthetic appeal than sheet-goods products. People ordering custom furniture order solid wood products utilizing parametric joinery. Such high end furniture is custom designed including various complex or parametric joinery and cut to strict dimensions for optimal fit among solid wood pieces. The faces or sides of the solid wood pieces may be cut with complex couplings that ensure exceptional fit among the pieces. This highly accurate fit among pieces of solid wood increases the end quality of the piece of furniture. "Parametric joinery" as used herein refers to the use of complex joints (e.g., miter joint, dovetail joint, dado joint, mortise and tenon joint, etc.) between two or more solid wood components in the construction of solid wood products. A "parametric joint" as used herein refers to any complex joint (used in production of solid wood products (e.g., miter joint, dovetail joint, dado joint, mortise and tenon joint, etc.).

In many cases, sheet-goods products have been sold fully assembled by the manufacturer or provided in a kit for end user assembly. In contrast, solid wood furniture utilizes conventional wood furniture fabrication techniques and typically requires a large amount of time, skill, and training to produce a quality product. In this regard, custom solid wood products typically require the skill and training of a master of the craft such as a master carpenter, as well as a large assortment of woodworking tools, workspace and other resources.

With the advent of computer numerical control (CNC) tools (e.g., routers, lasers, water jet cutters, or the like), some furniture manufacturers have gained the ability to perform a number of woodworking operations by writing and implementing (what is often) complex machine code (such as "G-code"), but implementation of many woodworking operations is still time-consuming and tedious. In many cases, adjusting a single parameter of a component, such as the height of a side of a cabinet, requires re-writing of machine code and/or re-calculation of numerous product/component dimensions, angles of cuts and (x, y, z) start and end positions of machines and the like (collectively, "product parameters").

A CNC wood router, also known as a CNC wood milling machine, CNC wood router, CNC wood lathe, CNC router machine, CNC wood cutter or CNC woodworking machine, is a computer numerical control tool that uses computer software to drive a mechanical system. For example, traditionally, a simple chair's underlying components may be designed using computer aided design (CAD) software, which is a tedious process that requires each individual piece of the chair be manually drawn with the software. Use of complex joinery is impossible or nearly impossible using such a labor-intensive process. A designer may become satisfied with the three-dimensional models of the components, the software may be configured to generate simple G-code based on the drawings, and the wood CNC machine executes the design and manufactures the product. However, designing intricate furniture parts requires an extensive knowledge in CAD programming and is heavily time-intensive even for the most skilled designers.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for optimizing the execution of parametric joinery.

As discussed in further detail below, sheet-goods products are of lower quality and durability than solid wood products and do not allow for customization. Embodiments of the present invention can utilize the functionality of a state-of-the-art manufacturing device such as a 5-axis router to implement intricate cuts such as parametric joints on solid wood components (the pieces that make up solid wood products/furniture). In doing so, embodiments of the present invention provide the functional benefit of ensuring that the construction of a solid wood product manufactured using automated machinery may be customized and include inherent strength.

According to embodiments of the invention, the system may include one or more memory devices; and one or more processing devices operatively coupled to the one or more memory devices, wherein the one or more processing devices are configured to execute computer-readable program code to receive information associated with one or more variables for one or more components, wherein the one or more components are associated with a furniture product type, wherein the information comprises one or more attributes associated with the one or more components; access a template associated with the furniture product type, wherein the template comprises: (i) information associated with one or more components each associated with one or more variables, and (ii) parametric joint information associated with one or more parametric joints, the one or more parametric joints associated with the one or more components each associated with one or more variables; and process the received information based on at least the accessed template. The processing may include determining a relationship between each of the one or more variables associated with the one or more components; determining a ratio of each of the one or more variables relative to each other; and determining the one or more attributes for the one or more variables associated with the one or more parametric joints. The computer readable program code may be further to generate template information based on at least processing the received information, the generating comprising calculating a value for each of the one or more variables based on at least the user input and the relationship between each of the one or more variables associated with the one or more components; convert the generated template information into a production format comprising machine code to be transmitted to a manufacturing device; and transmit the converted template information to the manufacturing device.

In some embodiments, the computer readable program code is further to cause the at least one processing device to initiate a presentation of a first user interface on a user device associated with a user, the first user interface comprising a one or more furniture products to be manufactured; receive, using the first user interface, a user selection of at least one of the one or more furniture products; initiate a presentation of a second user interface on the user device associated with the user based on at least the user selection of at least one of the one or more furniture products, the second user interface comprising one or more furniture product types associated with the at least one of the one or more furniture products selected by the user; receive, using the second user interface, a user selection of at least one of the one or more furniture product types; and initiate a presentation of a third user interface on the user device associated with the user based on at least the user selection of at least one of the one or more furniture product types, the third user interface comprises one or more variables, wherein the one or more variables are associated with one or more components of the at least one of the one or more furniture product types selected by the user, whereby the one or more variables define one or more attributes for the one or more components.

In some embodiments, the computer readable program code is further configured to cause the at least one processing device to generate a furniture plan for the one or more components associated with the at least one of the one or more furniture product types based on at least the generated template information; and transmit control signals based on the furniture plan to cause the manufacturing equipment to implement the furniture plan, wherein implementing the furniture plan further comprises manufacturing the one or more components.

In some embodiments, generating the furniture plan further comprises generating a schematic diagram of the one or more components associated with the at least one of the one or more furniture product types selected by the user, wherein the schematic diagram comprises a computer aided diagram.

In some embodiments, the computer readable program code is further configured to cause the at least one processing device to generate a template for each of the one or more furniture product types, wherein the template comprises one or more components associated with the one or more furniture product types and one or more sub-components associated with the one or more components, wherein each of the one or more sub-components comprises one or more attributes. In some such embodiments, the computer readable program code is further configured to cause the at least one processing device to initiate a presentation of a tool box comprising one or more sub-components and one or more parametric joints; receive a user selection of at least one of the one or more sub-components and/or one or more parametric joints from the toolbox; retrieve the at least one of the one or more sub-components and/or one or more parametric joints from the toolbox to be added to the template; and add the retrieved one or more sub-components and/or the one or more parametric joints to the template, wherein adding the retrieved one or more sub-components and/or the one or more parametric joints further comprises receiving a user input for the one or more attributes for one or more variables associated with the one or more sub-components.

In some embodiments, the computer readable program code is further configured to cause the at least one processing device to receive one or more manufactured components from the manufacturing device, the components manufactured based on at least the furniture plan; and facilitate assembly of the at least one of the one or more furniture parts based on at least the one or more manufactured components.

In some embodiments, the machine code comprises G-code.

In some embodiments, the machine code is configured to control, at least in part, the manufacturing device. In some such embodiments, the manufacturing device is a five (5)-axis router. In other such embodiments, the machine code comprises second machine code configured to control, at least in part, a second manufacturing device.

According to embodiments of the invention, a system for optimizing the execution of parametric joinery includes one or more memory devices; and one or more processing devices operatively coupled to the one or more memory devices, wherein the one or more processing devices are configured to execute computer-readable program code to process information associated with one or more variables for one or more components, wherein the one or more components are associated with a furniture product type, wherein the information comprises one or more attributes associated with the one or more components, wherein the processing is based on at least a template associated with the furniture product type, wherein the template comprises: (i) information associated with one or more components and one or more variables associated with the one or more components, and (ii) parametric joint information associated with one or more parametric joints, the one or more parametric joints associated with the one or more components and one or more variables associated with the one or more components. The computer readable program code is further configured to generate template information based on at least processing the received information, the generating comprising calculating a value for each of the one or more variables based on at least the user input and a relationship between each of the one or more variables associated with the one or more components; and convert the generated template information into machine code to be transmitted to a manufacturing device.

According to embodiments of the invention, a method for optimizing the execution of parametric joinery includes receiving information associated with one or more variables for one or more components, wherein the one or more components are associated with a furniture product type, wherein the information comprises one or more attributes associated with the one or more components; accessing a template associated with the furniture product type, wherein the template comprises: (i) information associated with one or more components each associated with one or more variables, and (ii) parametric joint information associated with one or more parametric joints, the one or more parametric joints associated with the one or more components each associated with one or more variables; processing the received information based on at least the accessed template. The processing includes, the processing includes determining a relationship between each of the one or more variables associated with the one or more components; determining a ratio of each of the one or more variables relative to each other; and determining the one or more attributes for the one or more variables associated with the one or more parametric joints. The method also includes generating template information based on at least processing the received information, the generating comprising calculating a value for each of the one or more variables based on at least the user input and the relationship between each of the one or more variables associated with the one or more components; converting the generated template information into a production format comprising machine code to be transmitted to a manufacturing device; and transmitting the converted template information to the manufacturing device.

In some embodiments, the method includes initiating a presentation of a first user interface on a user device associated with a user, the first user interface comprising a one or more furniture products to be manufactured; receiving, using the first user interface, a user selection of at least one of the one or more furniture products; initiating a presentation of a second user interface on the user device associated with the user based on at least the user selection of at least one of the one or more furniture products, the second user interface comprising one or more furniture product types associated with the at least one of the one or more furniture products selected by the user; receiving, using the second user interface, a user selection of at least one of the one or more furniture product types; and initiating a presentation of a third user interface on the user device associated with the user based on at least the user selection of at least one of the one or more furniture product types, the third user interface comprises one or more variables, wherein the one or more variables are associated with one or more components of the at least one of the one or more furniture product types selected by the user, whereby the one or more variables define one or more attributes for the one or more components.

In some embodiments, the method includes generating a furniture plan for the one or more components associated with the at least one of the one or more furniture product types based on at least the generated template information; and transmitting control signals based on the furniture plan to cause the manufacturing equipment to implement the furniture plan, wherein implementing the furniture plan further comprises manufacturing the one or more components.

In some embodiments, generating the furniture plan further comprises generating a schematic diagram of the one or more components associated with the at least one of the one or more furniture product types selected by the user, wherein the schematic diagram comprises a computer aided diagram.

In some embodiments, the method also includes generating a template for each of the one r more furniture product types, wherein the template comprises one or more components associated with the one or more furniture product types and one or more sub-components associated with the one or more components, wherein each of the one or more sub-components comprises one or more attributes. In some such embodiments, the method includes initiating a presentation of a tool box comprising one or more sub-components and one or more parametric joints; receiving a user selection of at least one of the one or more sub-components and/or one or more parametric joints from the toolbox; retrieving the at least one of the one or more sub-components and/or one or more parametric joints from the toolbox to be added to the template; and adding the retrieved one or more sub-components and/or the one or more parametric joints to the template, wherein adding the retrieved one or more sub-components and/or the one or more parametric joints further comprises receiving a user input for the one or more attributes for one or more variables associated with the one or more sub-components.

In some embodiments, the method includes receiving one or more manufactured components from the manufacturing device, the components manufactured based on at least the furniture plan; and facilitating assembly of the at least one of the one or more furniture parts based on at least the one or more manufactured components.

In some embodiments, the machine code comprises G-code configured to control, at least in part, the manufacturing device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
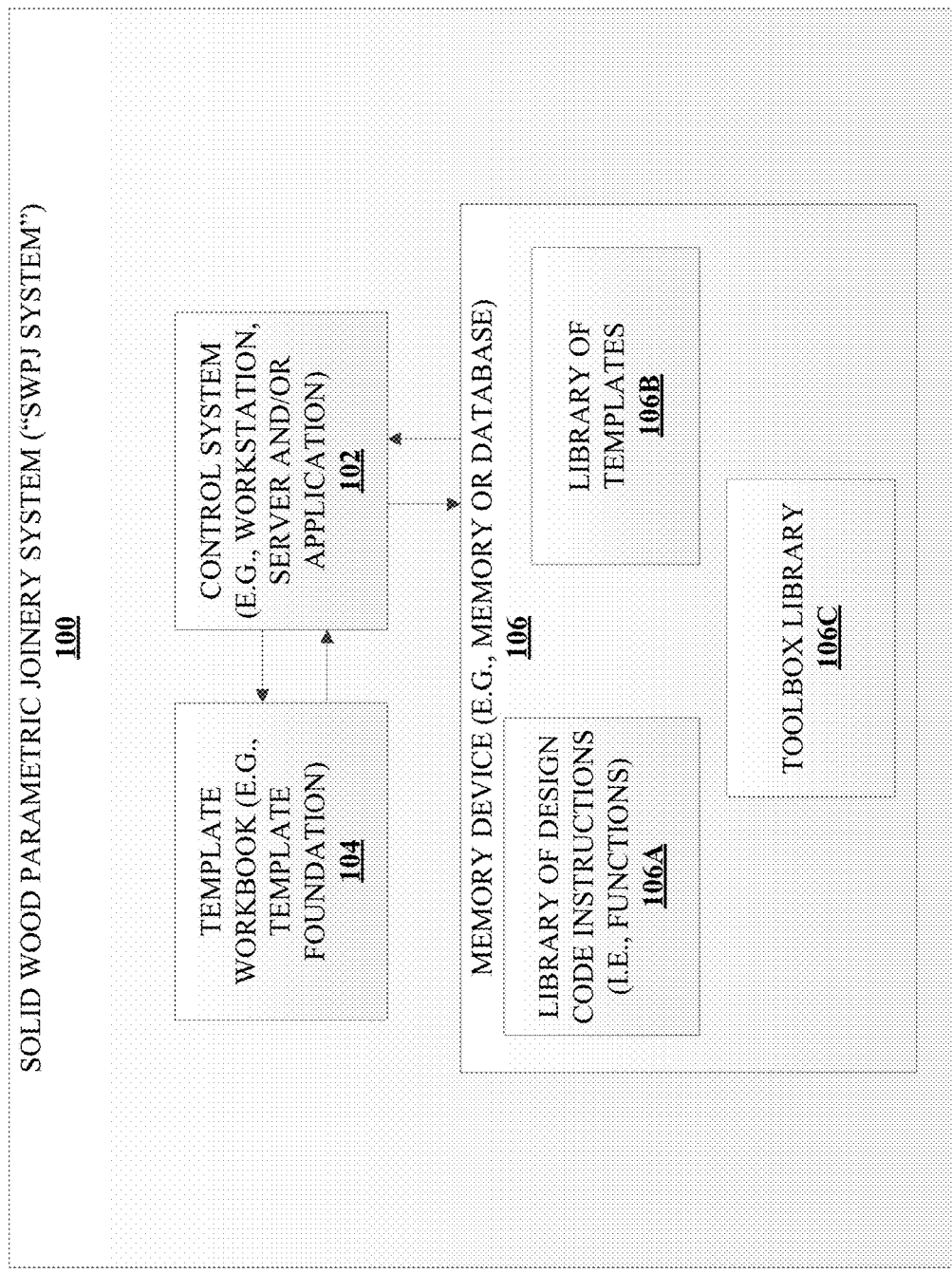
Figure 1B:
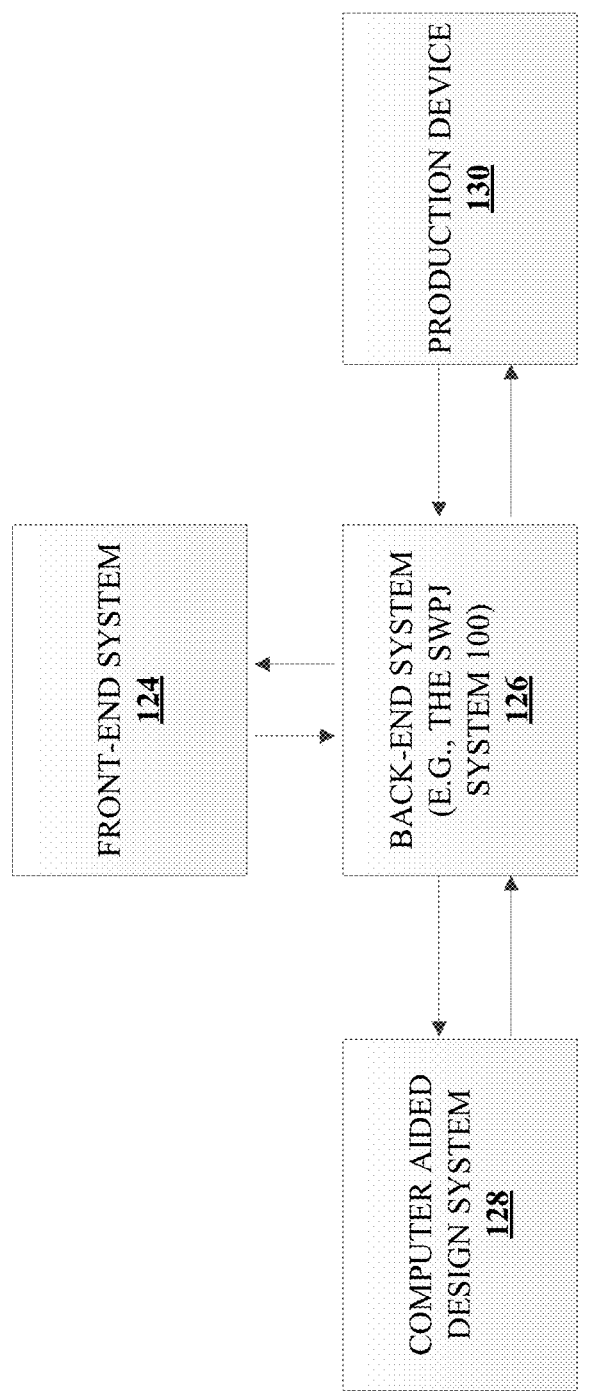
Figure 1C:
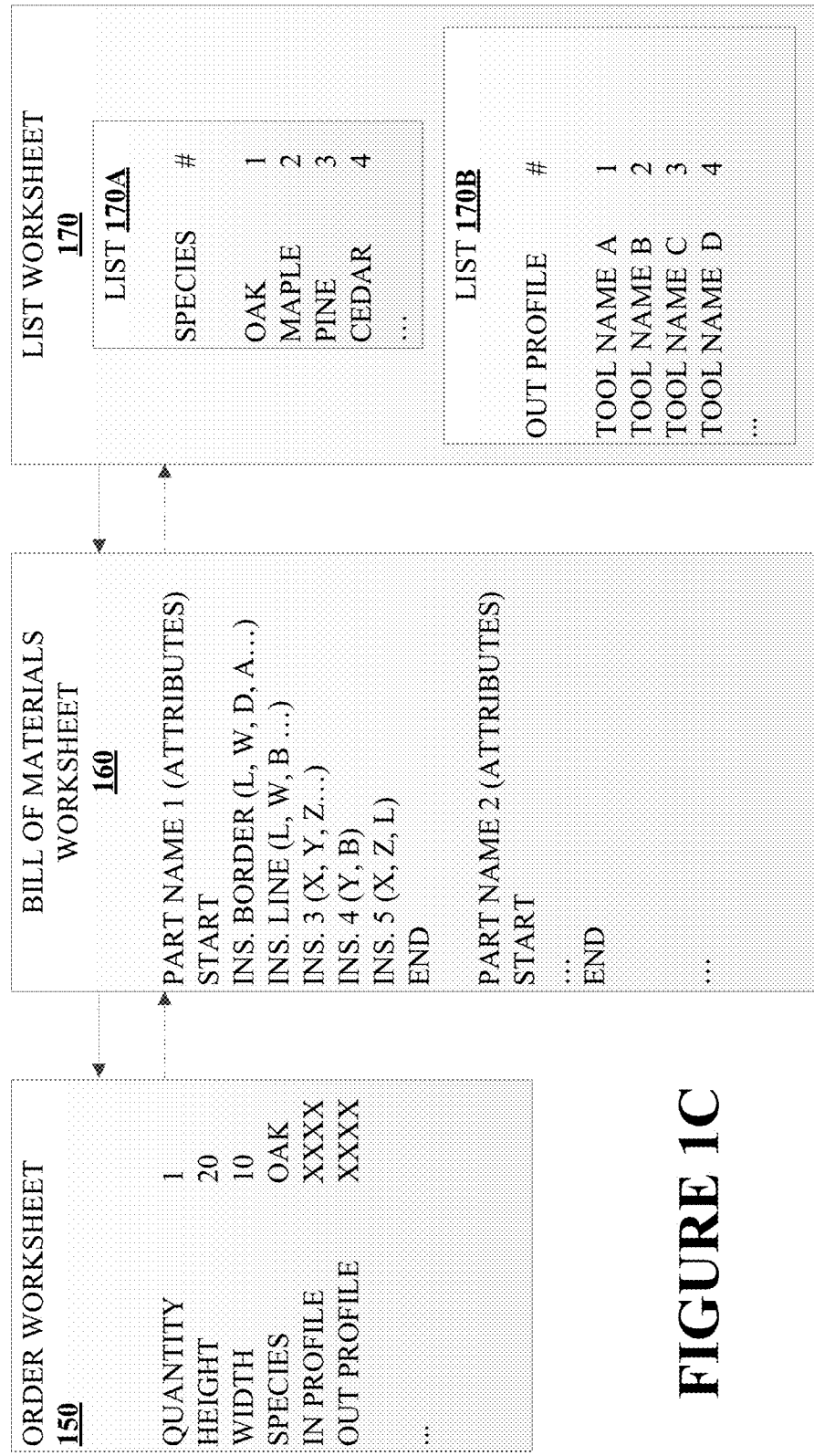
Figure 1D:
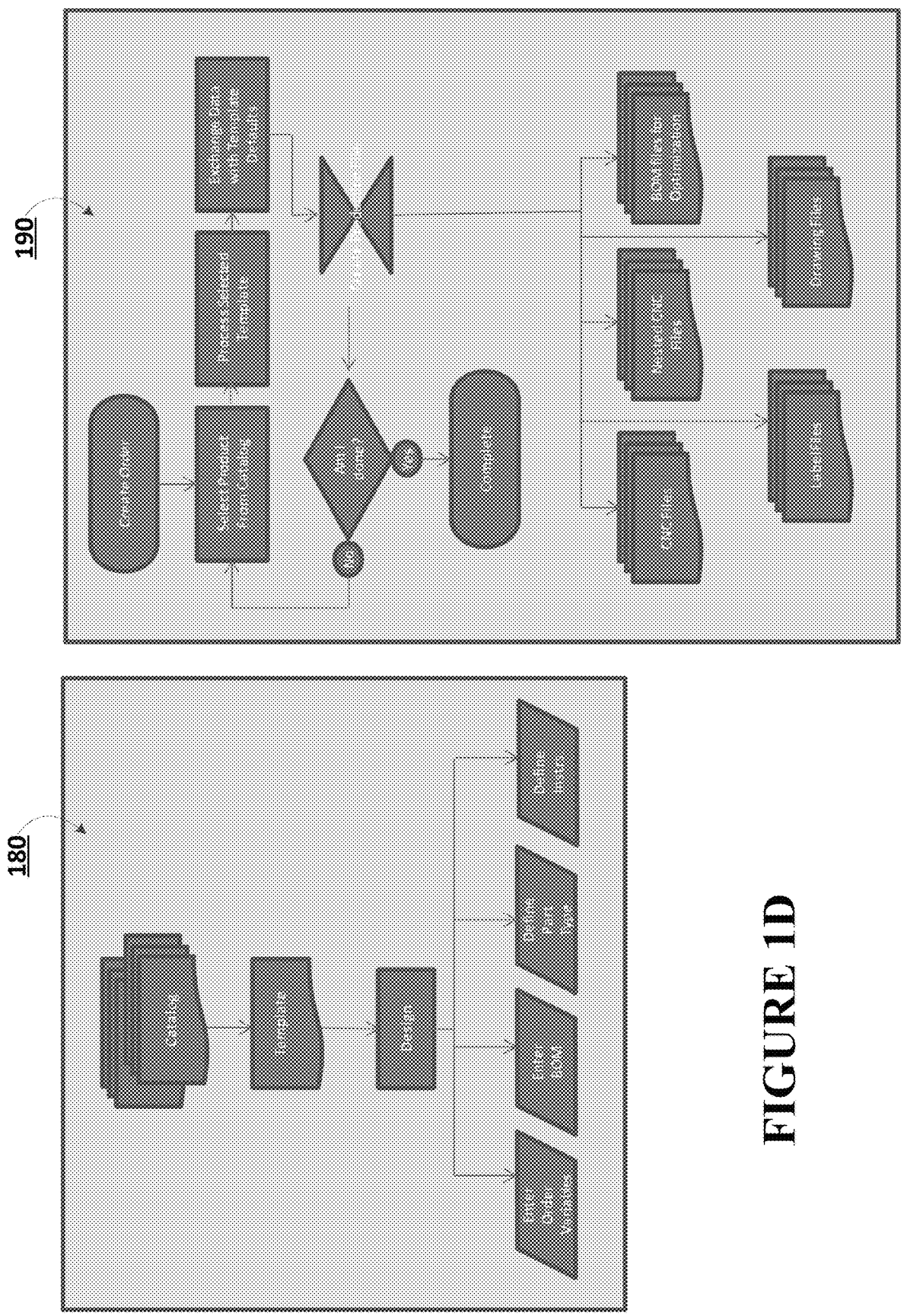
Figure 2A:
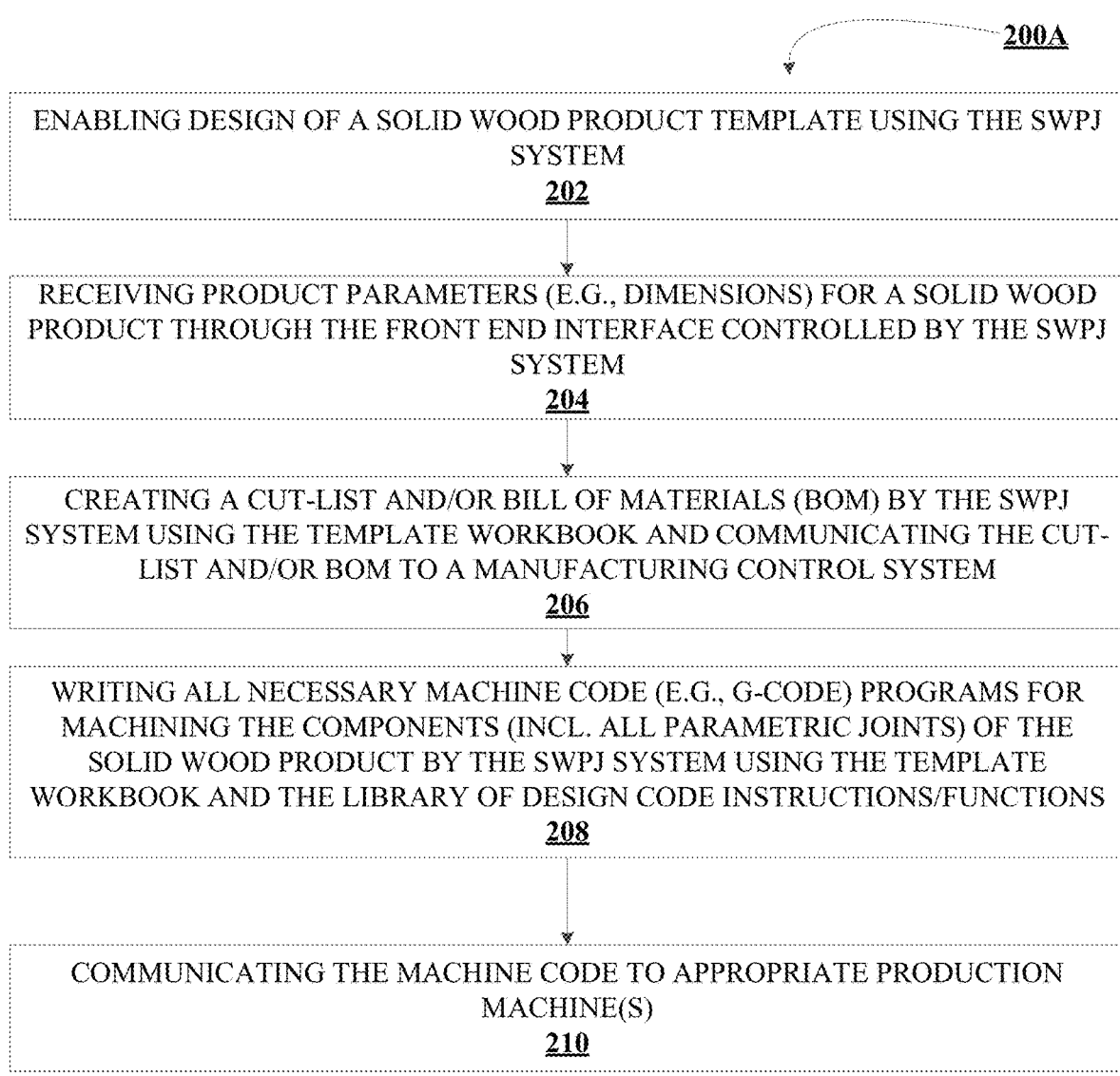
Figure 2C:
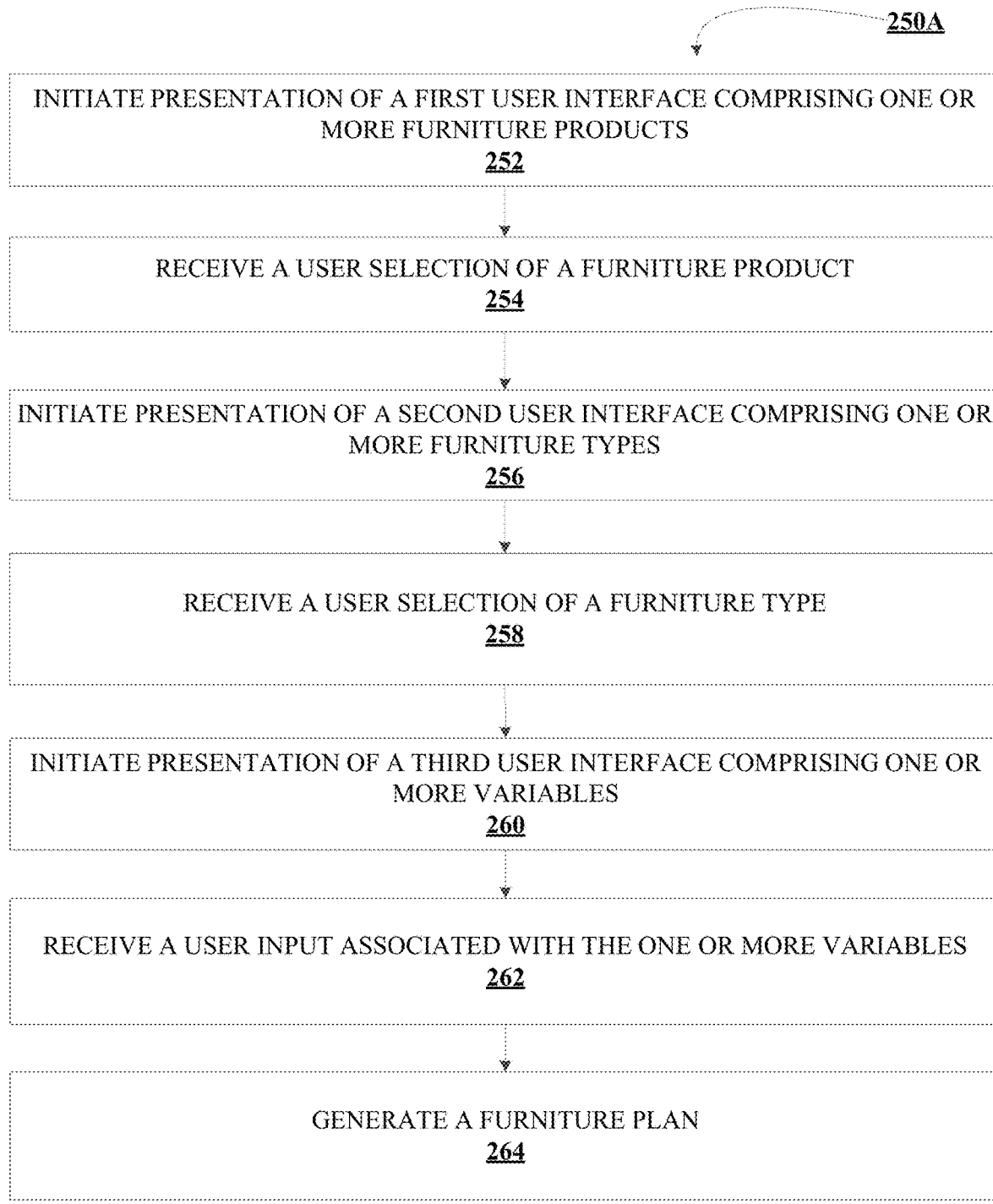
Figure 2D:
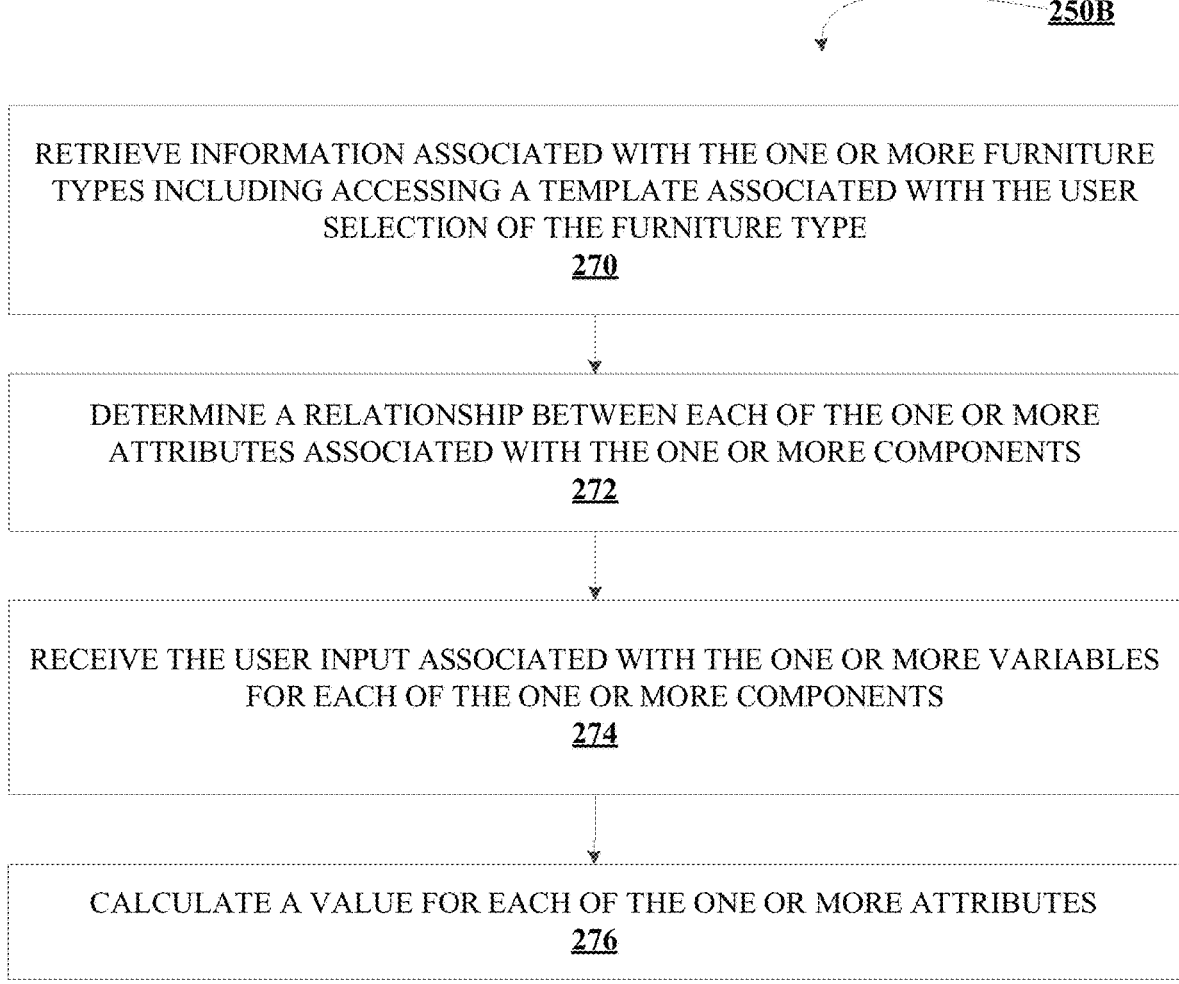
Figure 3:
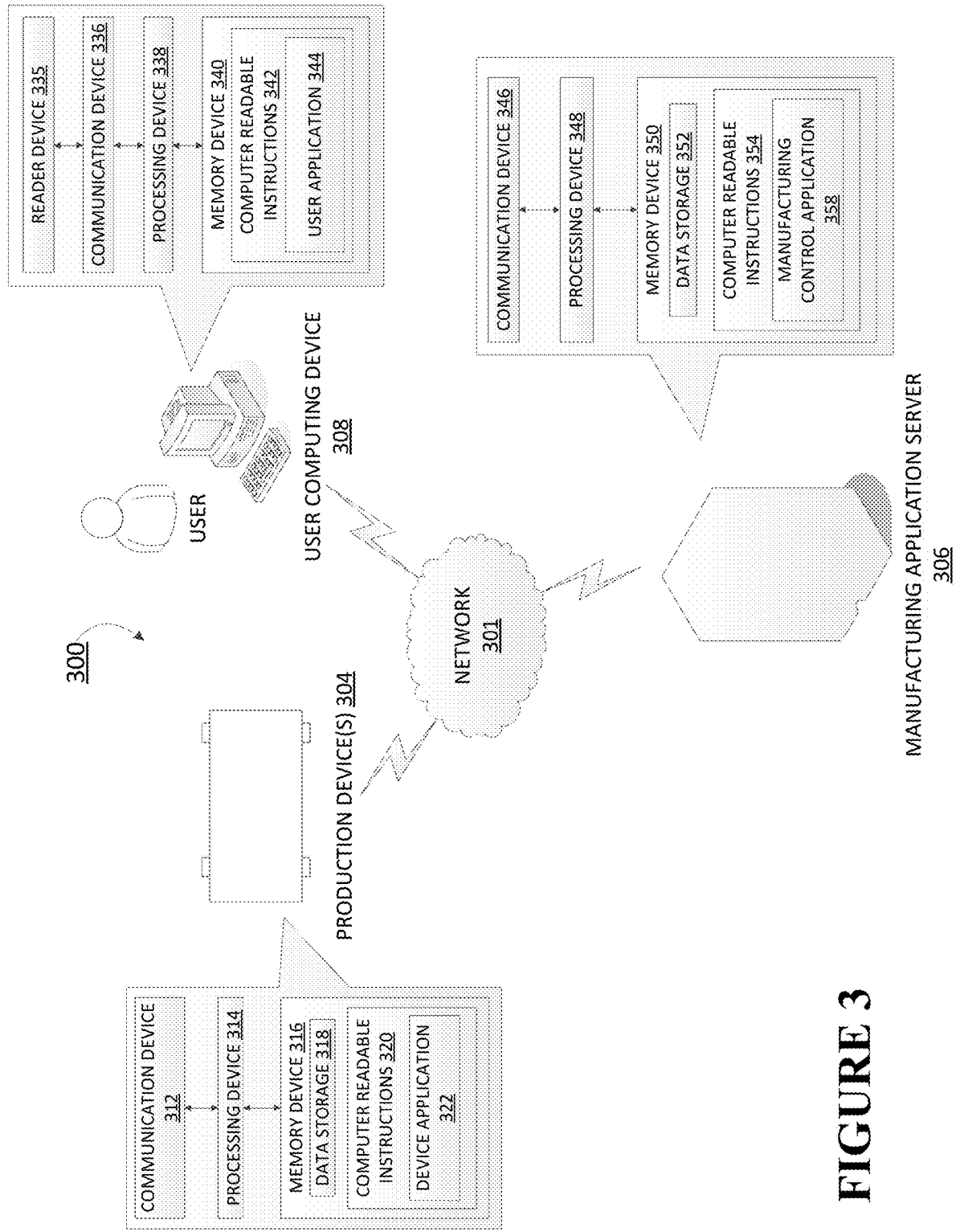
Figure 4:
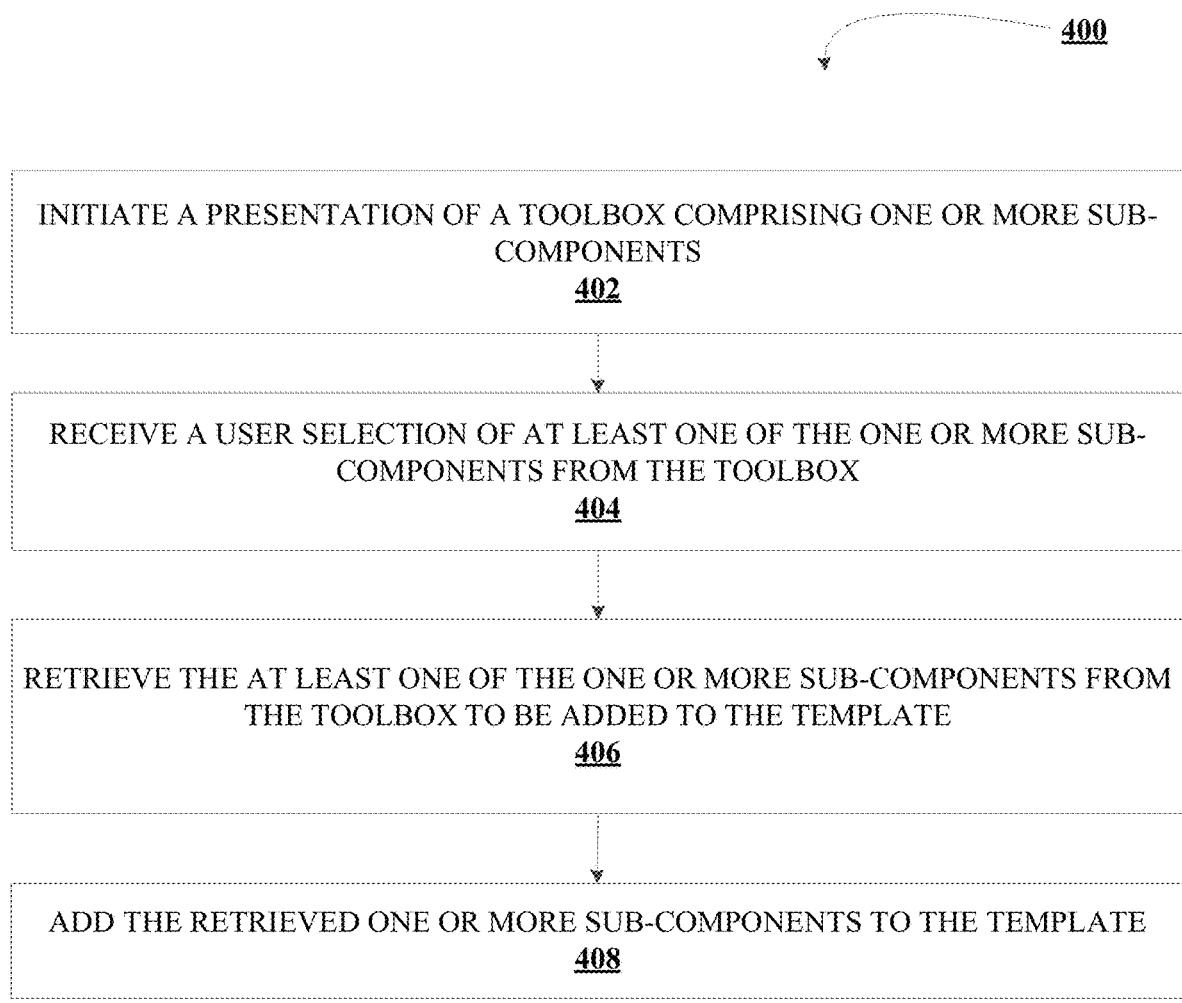
Figure 5A:
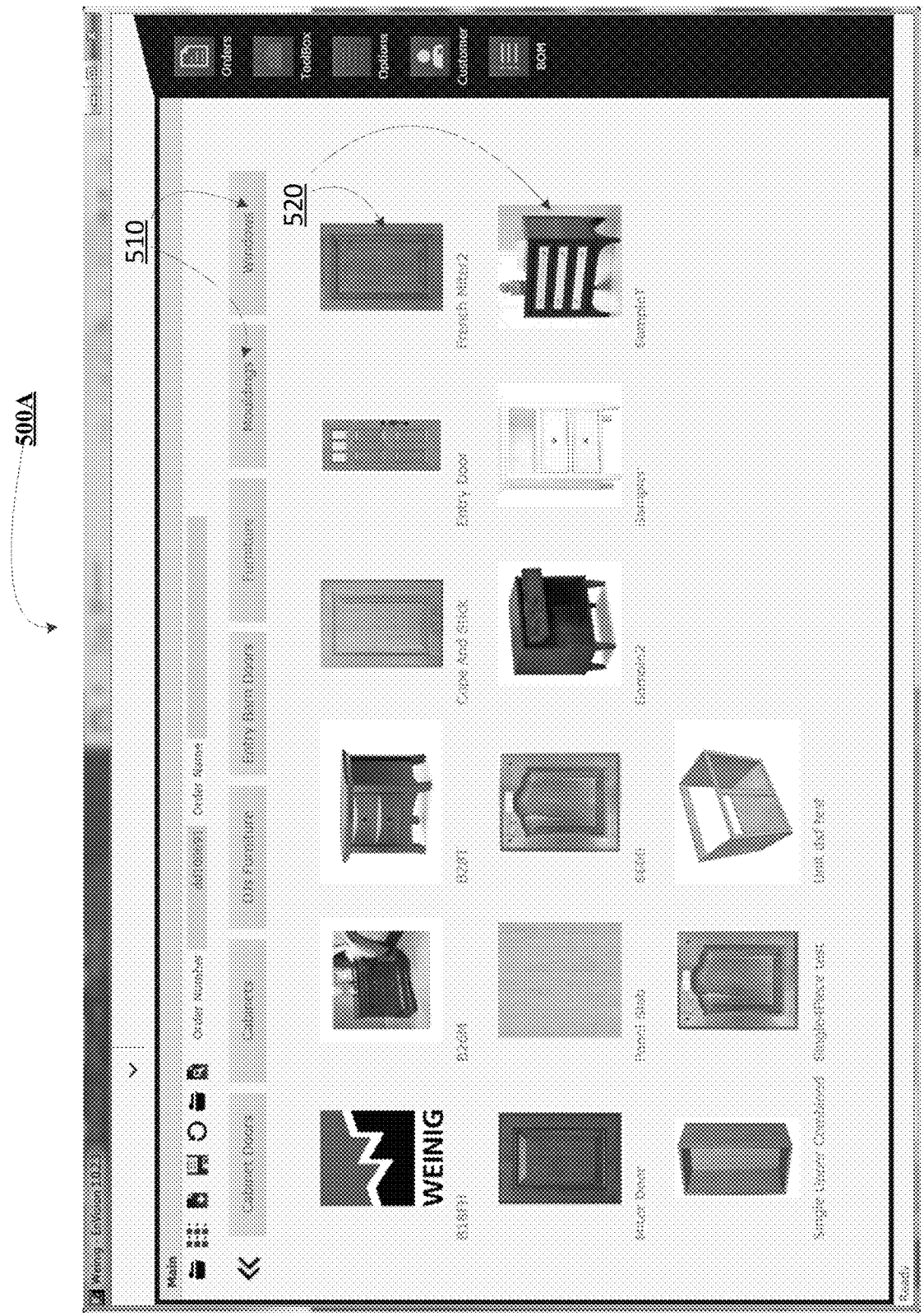
Figure 5B:
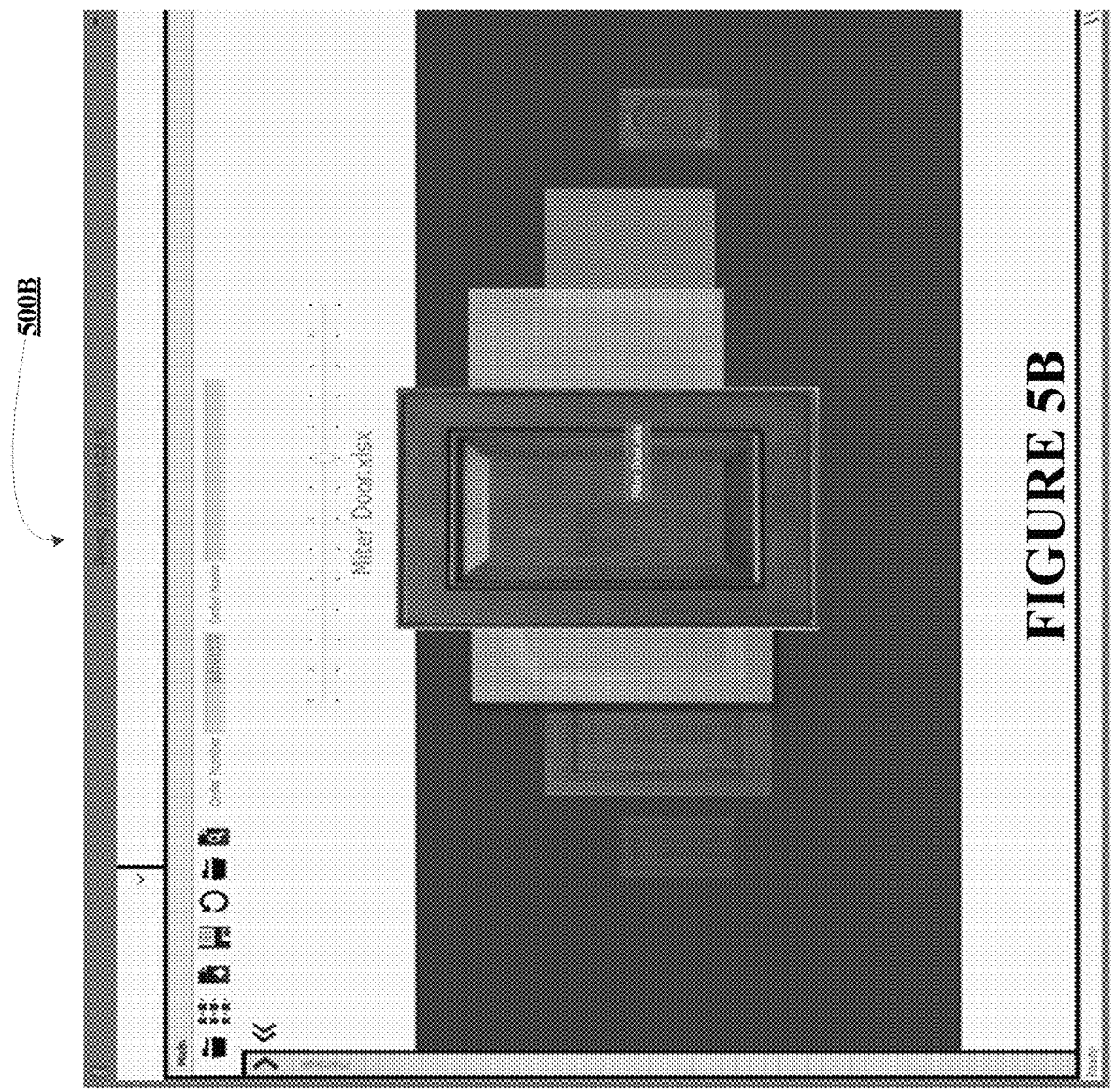
Figure 6:
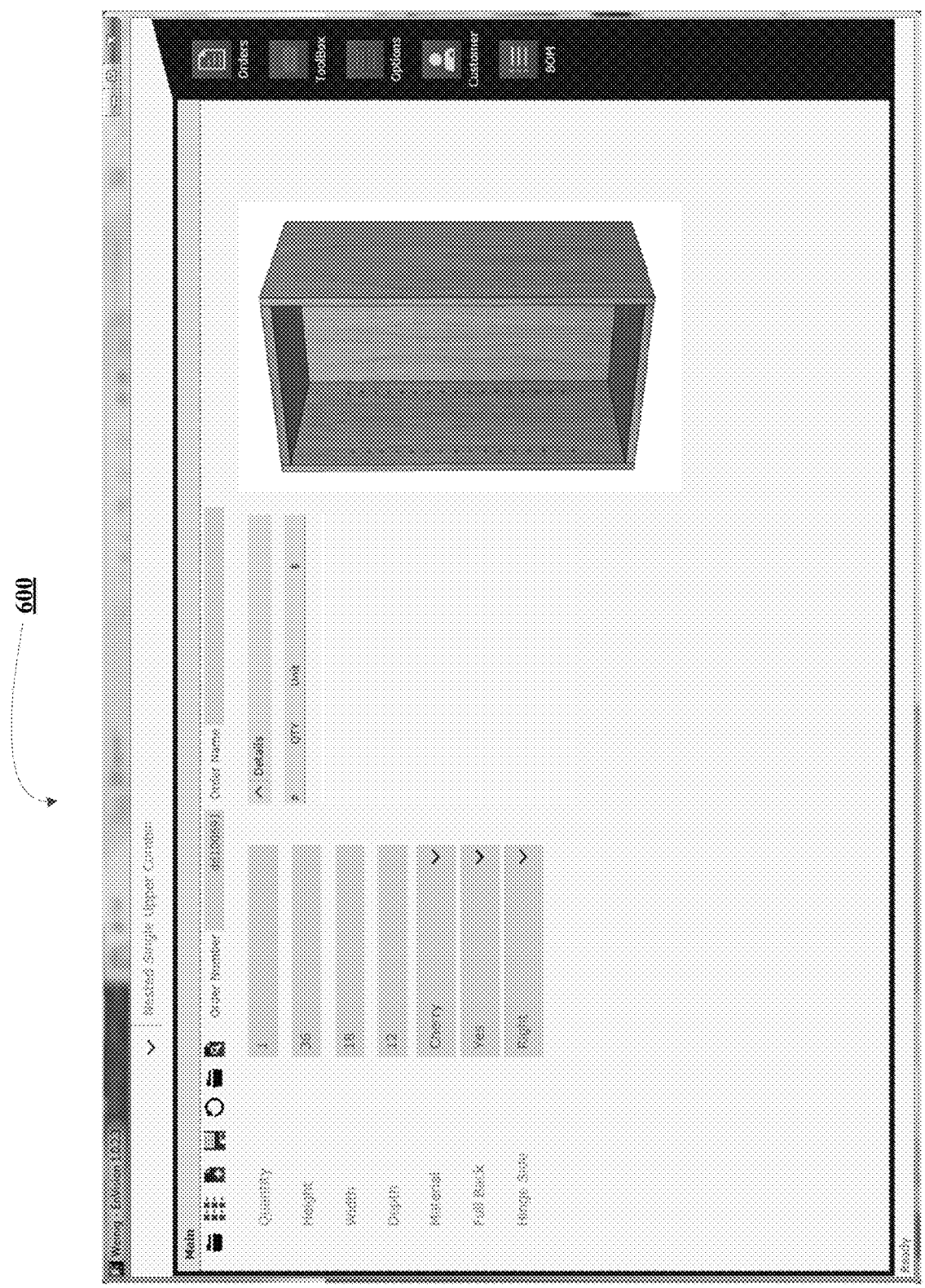
Figure 7:
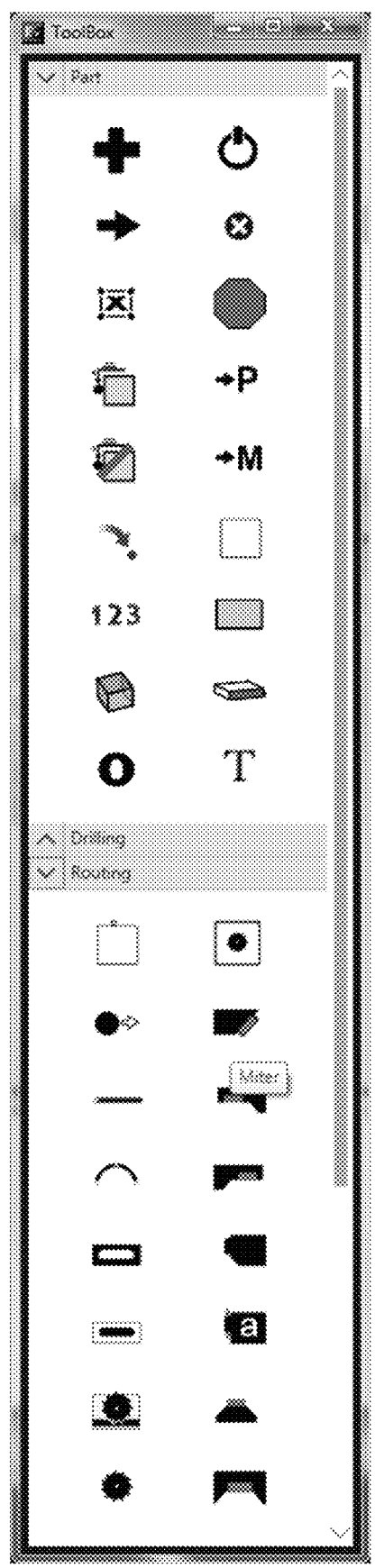
Figure 8:
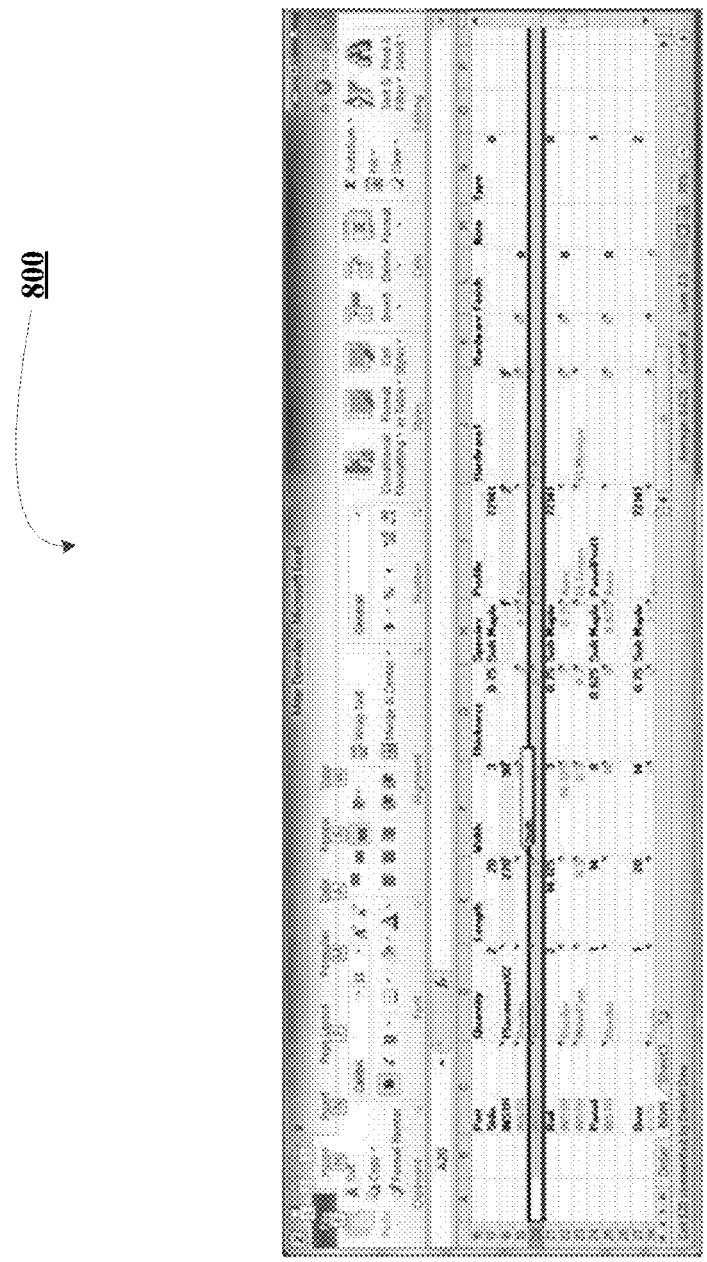
Figure 9:
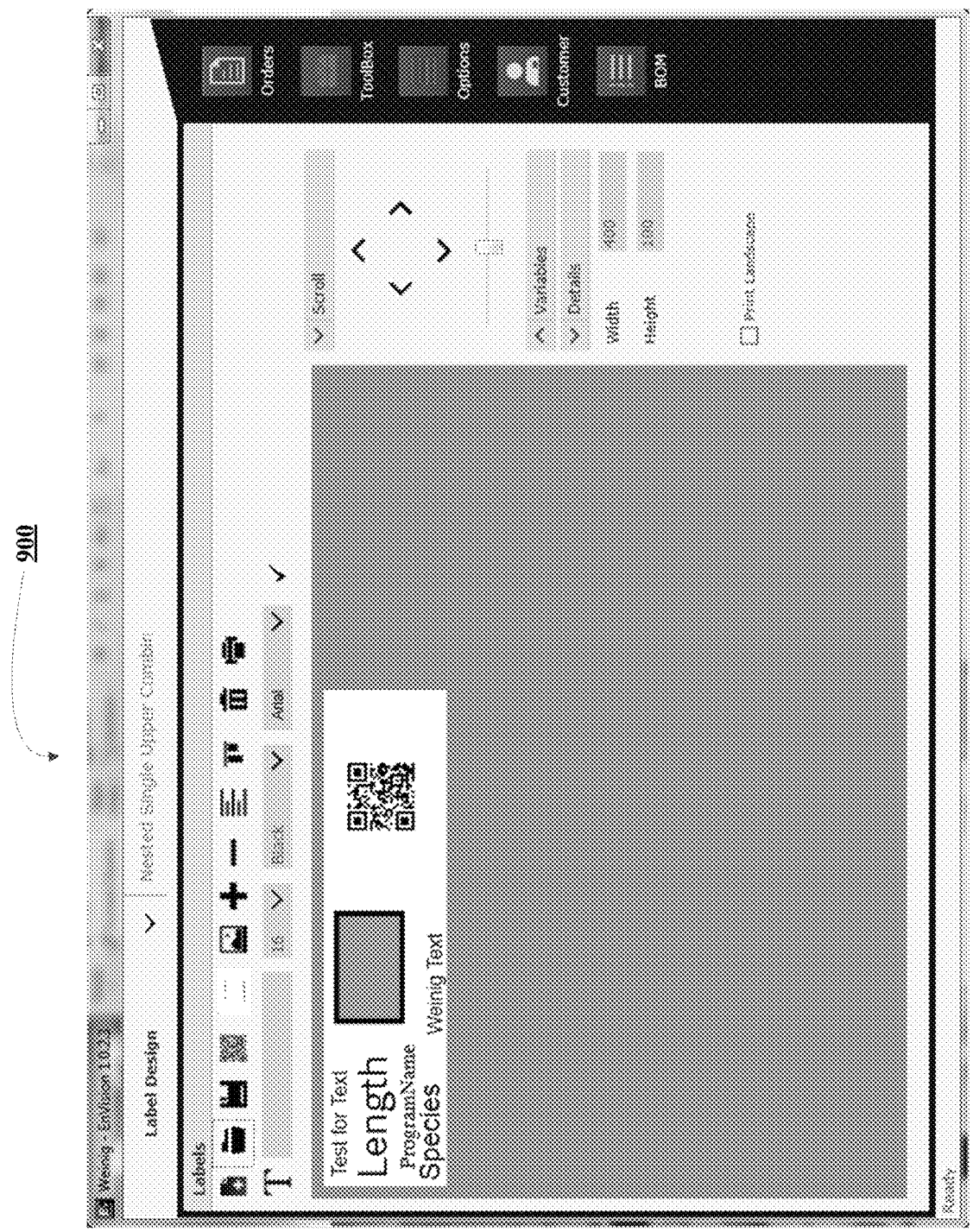

Having thus described embodiments of the invention in general terms, reference will now be made to the accompanying drawings, where:

FIG. 1A illustrates a diagram of a solid wood parametric joinery system according to embodiments of the invention;

FIG. 1B illustrates a diagram of an environment wherein a solid wood parametric joinery system may operate according to embodiments of the invention;

FIG. 1C illustrates a diagram representing a workbook including an order worksheet, a bill of materials worksheet and a list worksheet according to embodiments of the invention;

FIG. 1D shows a flowchart illustrating a high level method 180 for creating a solid wood product template and a high level method 190 for creating and implementing an order for solid wood products according to embodiments of the invention;

FIG. 2A shows a flowchart illustrating a method 200A for preparing for production of solid wood products according to embodiments of the invention;

FIG. 2B shows a flowchart illustrating a method 200B for production of solid wood products according to embodiments of the invention;

FIG. 2C shows a flowchart illustrating a method 250A for generating a furniture plan according to embodiments of the invention;

FIG. 2D shows a flowchart illustrating a method 250B for determining a relationship between one or more attributes associated with the one or more components according to embodiments of the invention;

FIG. 3 illustrates a system environment for optimizing the execution of parametric joinery for solid wood products according to embodiments of the invention;

FIG. 4 is a flowchart illustrating a method for adding one or more sub-components to a furniture product template according to embodiments of the invention;

FIG. 5A illustrates a screenshot of a standard first user interface for providing a customer with a plurality of furniture products according to embodiments of the invention;

FIG. 5B illustrates a screenshot of a carousel first user interface for providing a customer with a plurality of furniture products according to embodiments of the invention;

FIG. 6 illustrates a screenshot of a second user interface for providing a customer with a plurality of furniture product types according to embodiments of the invention;

FIG. 7 illustrates a screenshot of a third user interface referred to as a toolbox according to embodiments of the invention;

FIG. 8 illustrates a screenshot of an exemplary workbook bill of materials worksheet according to embodiments of the invention; and FIG. 9 illustrates a screenshot of an exemplary label design interface according to embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. However, it may be evident that such embodiment(s) may be practiced without these specific details. Various embodiments or features will be presented in terms of systems that may include a number of devices, components, modules, and the like. It is to be understood and appreciated that the various systems may include additional devices, components, modules, or the like and/or may not include all of the devices, components, modules or the like discussed in connection with the figures. A combination of these approaches may also be used.

Where possible, any terms expressed in the singular form herein are meant to also include the plural form and vice versa, unless explicitly stated otherwise. As used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, as used herein, a "user" refers to a customer, a client, a buyer, or purchaser in the market for a solid wood product. Also, as used herein, a "vendor" refers to an individual in a manufacturing or production facility that is in charge of the management and operation of machine tools, equipment, management of supply, partially manufactured and/or completely manufactured inventories of solid wood products, or any combination of the aforementioned. In some embodiments, a vendor may be a distributor who establishes a connection between the user and the manufacturer. In this regard, the vendor may receive a request for a solid wood product from a customer and transmit the request to a manufacturer for processing. Also, as used herein, the term "species" shall mean one or more types of solid wood that may be used by a manufacturer (e.g. poplar, maple, oak, cherry, mahogany and the like). A "job" as used herein may refer to the production of one or more goods such as any solid wood product. In addition, the term "order" is used herein to denote any request made for the production of furniture components such as solid wooden cabinets.

Summary of Solid Wood Parametric Joinery System

Embodiments of the present invention provide systems, methods, and computer program products for optimizing the execution of parametric joinery for solid wood products. Some embodiments of the system may refer to or include a plurality of stations that each perform at least one of the steps described herein and are coupled to at least one other station (referred to herein as the "solid wood parametric joinery system" or "SWPJ system").

As discussed above, sheet-goods products are of lower quality and durability than solid wood products and do not allow for customization. Sheet-goods products are often constructed from particleboard coated with colored melamine or wood veneers. Some sheet-goods product uses include entertainment centers, electronic and computer furniture, storage units, cabinets, desks, and dressers. This furniture alternative (i.e., sheet-goods products) is typically manufactured using automated machinery and assembled using boring of holes and hardware. In contrast, embodiments of the present invention can utilize the functionality of a state-of-the-art manufacturing device such as a 5-axis router to implement intricate cuts such as parametric joints on solid wood components (the pieces that make up solid wood products/furniture). In doing so, embodiments of the present invention provide the functional benefit of ensuring that the construction of a solid wood product manufactured using automated machinery may be customized and include inherent strength.

Furthermore, designing and cutting solid wood pieces and/or implementing parametric joinery for building furniture is a sophisticated profession requiring deep industry knowledge and experience. In order to design a piece of furniture, for example a hutch for a desk, a designer must design each individual component or piece of solid wood that goes into the hutch. In doing so, the designer must calculate each dimension of the component as well as any angles necessary for shaping the component to effectively form any required joints with other components. Traditionally, in order to cut a piece of solid wood into a component for furniture, a designer or machine operator must write machine code to instruct the cutting machine to make the proper cuts at the proper angles with the proper dimensions, etc. This machine code is sometimes referred to as "G-code". In order to instruct a router to properly cut a joint such as a dove tail joint, for example, on an edge of a piece of wood, an operator must write numerous lines of G-code—lines of code that include precise dimensions of the dove tail joint, as well as angles necessary for cutting the dove tail joint. This process, including designing each individual component and preparing G-code to instruct machine operation for each component, may need to be replicated every time a custom piece of custom furniture is ordered, an endeavor that may require tens or even hundreds of designer hours.

Thus, the inventors identified a need for a system to optimize the preparation of solid wood pieces used in the creation of solid wood products. The inventors recognized that such a system should enable a user to select a furniture product (e.g., hutch, cabinet, or the like) and customize the furniture product to detailed specifications.

Embodiments of the present invention, therefore, provide a solid wood parametric joinery system 100 (also referred to herein as a "SWPJ system"), as shown in FIG. 1A. The SWPJ system 100 may be used to manufacture each solid wood product to exact specifications of the user, reduce waste, and increase productivity. The SWPJ system 100, in various embodiments, includes a control system 102 configured to access a memory device 106 (such as a memory, database, datastore or the like) that, in some cases, includes one or more of a library of design code instructions 106A (i.e., functions), a library of templates 106B (e.g., pre-programmed templates for portions or complete solid wood products or templates programmed by the provider of the solid wood parametric joinery system), and a toolbox library 106C that may include none, one or more of each of the following: representations of commonly used components (e.g., door of a cabinet), representations of commonly used portions of components (e.g., rail, panel or style of a door of a cabinet), representations of commonly used joints (e.g., tenon and/or mortise portion of a joint used to attach a style with a rail of a door of a cabinet), representations of commonly used products (e.g., a cabinet), representations of commonly used portions of a product (e.g., a box of a cabinet) and/or the like (collectively, the "design tools").

The control system 102 may be or include a control application that controls operation and/or interacts with a workbook 104 to enable a designer to create a template for a solid wood product as well as to open and use existing templates. The workbook 104 is or may include one or more spreadsheets, worksheets, workbooks, or data collection and/or manipulation tools (e.g., the workbook may be a collection of worksheets contained within a spreadsheet file). Templates may be created using the BOM worksheet 160 populated with design code related to each of the components of the product. Embodiments of the control system 102 populate the BOM worksheet 160 with pre-programmed design code related to standard components and/or joints, but also enables communication between the workbook 104 and other applications or machines, such as production devices 130 (FIG. 1B) such as a CNC machine. Embodiments of the invention can automatically and in real-time or near real-time create machine code programs (e.g., G-code programs) necessary to cut components including any complex joints, edging or the like using a production device such as a 5-axis router. Creating the machine code programs may be based on templates and product parameters input by a user through the front-end interface and/or pre-programmed machine code modules corresponding to design codes within the template.

Additionally, some embodiments of the invention use the template and the front-end user input to create a CAD drawing of a component or an entire product. Historically, creation of a CAD drawing incorporating all components of a complex product would be impractical.

The workbook 104, in some embodiments, is available to some users and unavailable to other users. For example, in some cases, a designer associate of the provider of the SWPJ system and/or a designed associate of the vendor has access to the workbook 104 in order to make design-level modifications to templates. In contrast, in some cases, vendor sales people may be restricted from accessing or modifying the templates using the workbook 104. Rather, such restricted users may be granted access only to a "front-end interface" provided by a system, such as front-end system 124 of FIG. 1B. Such a front-end interface may be used by a customer or vendor user to manipulate particular product parameters based on the customer's preferences for a solid wood product order. Examples of front-end interfaces are provided in FIGS. 5 and 6.

Creating/Modifying Solid Wood Product Templates

Referring back to FIG. 1A, embodiments of the invention provide an opportunity for a vendor's designer(s) to create template(s) for solid wood products using the workbook 104. These templates are files that include data and instructions that define all the components and joints of a solid wood furniture product. A completed template, in various embodiments, may include a workbook 104 that includes design code structured to define various relationships between components and/or joints of a product. An element of the design code may be or include software modules that are or include one or more functions (also referred to as instructions) that are defined in the library of design code instructions 106A.

For example, a product may include a component called a rail, and the workbook may include a component called a rail. A rail component may require a designer to include a functional element "BORDER". When a designer includes the functional element "BORDER" in the workbook (e.g., in the BOM worksheet 160 shown in FIG. 1C), the control system 102, accesses the library of design code instructions 106A to determine that the BORDER instruction requires particular attributes. The control system 102 then automatically populates the BOM worksheet 160 with the corresponding attributes. The designer may then input any additional information, data or instructions required by the populated attributes.

Similarly, when a designer wishes to insert a specific component, joint, or product, the designer may review the toolbox library 106C using a toolbox interface, an example of which is shown in FIG. 7, to select a design tool. When the designer selects one of these design tools, the control system 102 automatically populates the BOM worksheet 160 with the appropriate faces, sides, angles, and other dimensional relationships, instructions, attributes, etc. required for a particular component, joint or product based on the information corresponding to the selected design tool in toolbox library 106C. Thus, preparation of the template by the designer may be drastically streamlined by using the libraries.

Once the template for a solid wood product is designed, the dimensions of the entire product are interrelated by the template such that, if a vendor or customer desires to change the height of a product such as a hutch, the front-end interface can accept the change in height and automatically re-calculate every other dimension for every component of the entire product based on the pre-defined interrelationships between the components and the inputted change in height.

Interaction of the SWPJ System with Other Systems

Referring now to FIG. 1B, an environment in which an SWPJ system 100 operates is illustrated. This environment may assist the SWPJ system with optimizing the execution of parametric joinery for solid wood products. In some embodiments, the environment has a back-end system 126, which may be or include the SWPJ system 100. The back-end system 126 may be a closed system, meaning that access to the back-end system 126 may be restricted to only certain users, such as template designers. The back-end system 126 is configured to present one or more back-end interfaces (such as those illustrated in FIGS. 1C, 7 and 8) to authorized users. The back-end system 126 may be in operative communication with a front-end system 124, a computer aided design (CAD) system 128, and one or more production devices 130 and is configured to transmit and receive instructions to implement the process flows described herein.

The front-end system 104 is operatively coupled to the back-end system 126 to transmit and receive parameters associated with a furniture component, furniture type, and/or a furniture product, such as customer-desired dimension information. Typically, the front-end system 124 enables the vendor to discuss the design requirements of a furniture product with a customer. The customer may either directly input the dimension information into the front-end system 124 or have the vendor input the information for them. The front-end system 124 includes several user interfaces discussed herein to enable the customer to begin the design process, such as those illustrated in FIGS. 5 and 6. In various embodiments, the back-end system 126 initiates and/or maintains some or all of one or more of the front-end interfaces through a vendor or customer computer system by providing some of all the content presented by the vendor or customer computer system.

In some embodiments, a CAD system 128 is operatively coupled to the back-end system 126 to transmit and receive instructions to implement one or more schematic drawings of a product or component. In this regard, the CAD system 108 may be configured to create a computer model (e.g., wire diagram) defined by geometric parameters (e.g., dimensions) that typically appear as a three-dimensional representation of the furniture component, furniture type, and/or the furniture product. These representations may be readily altered by changing relevant parameters in the front-end interface and requested an updated drawing. In this way, the CAD system 108 enables a user to simulate the objects before initiating the manufacturing process.

Similarly, the back-end system 126 may store one or more pictures of actual components and/or products and present them in conjunction with one of the front-end interfaces to demonstrate to the customer how a product or component will appear when complete.

Referring back to FIG. 1B, the production device 130 is operatively coupled to the back-end system 126 to transmit and receive instructions associated with the manufacturing process. The back-end system 126 may generate and send instructions in a production format, such as G-code. Typically, G-code is a preparatory program used to indicate the geometry of tool movements and necessary operating state of the manufacturing device controller. G-code also instructs linear cutting movements, drilling operations and specifies units of measurement. The back-end system 126 may use the template in combination with input from the user to form a "furniture plan", which refers to a complete plan to create a solid wood product.

The back-end system 126 may also be configured to transform the furniture plan into one or more G-code programs, for activation on the production device(s) 130. The G-code programs, in various embodiments, are capable of instructing the production device(s) 130 to affect controller motion, drilling, drilling cycles, or the like. In some embodiments, the production format may include parametric programming to incorporate both G-code and logical commands/constructs to create a programming language. In doing so, the system may be configured to enable custom machining cycles, such as fixture creation and bolt circles.

Examples of the Workbook

In some embodiments of the invention, as shown in illustration 140 of FIG. 1C, the workbook includes three (3) worksheets: an Order worksheet 150, a Bill of Materials (BOM) worksheet 160 and a List worksheet 170.

The Order worksheet 150 provides a location for information/data corresponding to an order to be stored, modified, saved, etc. In the example shown, the Order worksheet 150 includes various parameters for an order such as a quantity, height, width, species, inside profile, outside profile and the like. This worksheet is accessible by the control system 102 (FIG. 1A) and the values of the parameters may be set to default values initially and may be modified when a user makes a selection using the front-end interface. For example, a user may click on the species parameter. The front-end interface (typically by way of the control system 102) may retrieve a list of potential values of the species parameter from the List worksheet 170, an example of which is shown in FIG. 1C. The list 170A illustrates an example list of potential species including oak, maple, pine, cedar etc. These potential species, in some embodiments, are communicated to the front-end interface and they appear in a drop-down menu, thereby enabling the user to select which species the user desires. When the user makes the selection, the front-end interface communicates the selection back to the control system 102 and the species in the Order worksheet is updated to reflect the user's selection. In the example shown, the user has selected the oak species, and the Order worksheet 150 has been updated to reflect that selection.

In some embodiments, the value associated with the selection is stored in a "grid", which may be or include none, one or more of each of the following: databases, datastores, spreadsheets, worksheets, workbooks, grids, tables, etc. The grid may represent the furniture plan, which as discussed previously, is a plan based on the template for the product/component and also based on the user's input regarding an order. Thus, the grid, by representing the furniture plan, provides a consolidated summary of an order for products. However, in some embodiments, the grid stores only some of the information necessary to implement a furniture plan. For example, in some embodiments, the grid stores parameters and/or attributes or representations thereof, as well as, in some cases, programs of machine code and a relational table indicating which instructions/functions correspond to the programs of machine code. In such cases, in order for the control system 102 to generate G-code, for example, the control system 102 would access the BOM worksheet 160 for the instructions and the grid to determine what G-code programs are associated with the instructions as well as necessary parameters/attributes.

The grid may be organized in a variety of ways, and in various embodiments, it is updated with any data or information that is populated in the workbook, including any updates based on user input. The grid, for example, may be a worksheet within the workbook and may or may not be hidden from view of the designer. As indicated above, the grid may utilize values for various user selections or may use other mechanisms to simplify the amount of data/information stored in the grid. The control system 102 is in communication with the grid and may, in some embodiments, be in communication with one or more other databases, datastores, spreadsheets, worksheets, workbooks, grids, tables, etc. in order to access any necessary data, functions, tables, information, lists, attributes, etc. for generating machine code (e.g., G-code) programs, BOMs or cut-lists that are legible to other systems and/or users, drawings of components/products (e.g., CAD drawings), etc.

Referring back to the example discussed above, each of the species may be associated with a value, such as a number. In the example shown, the oak species is associated with the number "1", the maple species is associated with the number "2", etc. These associated values may be stored by the control system 102 in the grid. When the control system 102 prepares a communication to a station on a manufacturing floor, it may access the grid, retrieve the value "1" stored in a known location corresponding to the species of a component/product and communicate to the station that the species is oak.

In another example, when the control system 102 has received a request to proceed with an order from a customer, G-code may be generated. This may be done by the control system accessing the grid, which may include a version (e.g., a simplified version) of the design code stored in the BOM worksheet 160 in combination with all necessary attribute values for execution of the design code. The grid may contain or have links to a library of machine code definitions. These machine code definitions may be lines of code that are represented by an instruction or function of the BOM worksheet. For example, the function BORDER discussed above may correlate to fifty (50) lines of G-code stored in the grid or elsewhere. The function BORDER may be stored as part of the furniture plan in the grid, may be represented by some value known to the control system 102 in the grid, or in some cases, the BOM worksheet 160 may be accessed by the control system in order to determine the order of operations to be performed. In some embodiments, one or more of the worksheets 150, 160 and 170 are part of the grid.

Process Flows

Referring now to FIG. 1D, a high-level diagram and method 180 for creating a solid wood product template and a high level diagram and method 190 for creating and implementing an order for solid wood products are shown according to embodiments of the invention.

Diagram/method 180 illustrates a Catalog of templates, from which a single Template may be selected for Design or for ordering. A designer may Enter Order Variables (e.g., furniture type, quantity, etc.) for the template, a designer may Enter BOM information/instructions using the back-end interface, a designer may Define Parts, Types, etc. and Define Instructions for the template, all by using the back-end interface.

Diagram/method 190 illustrates order creation from Start ("Create Order") to Finish ("Complete"), and may be performed by a customer/vendor using the front-end interface. The user may Select a Product from the Catalog. Then the user Processes the Selected Template, which in some cases refers to the user completing all the fields provided in the front-end interface. As noted above, in some embodiments, a template may be designed to include default values for various attributes. In such a case, the user's selections are Exchanged with the Template Defaults. Once the user has finalized the order (or in some cases, the user may choose to simulate the order such as by generation of a drawing or picture of a product), the control system 102 creates production files (e.g, generates machine code for activating production machines, generating a BOM, generating a cut-list, etc. to be communicated to one or more stations on the manufacturing floor). In order to create the production files, the control system 102 may access one or more of the CNC Files, the Nested CNC Files, the BOM files for Optimization, the Label Files, the Drawing Files, and the like.

Referring now to FIG. 2A, a flowchart illustrates a method 200A for preparing for production of solid wood products according to embodiments of the invention. The first step, represented by block 202, is enabling design of a solid wood product template using the SWPJ system. The next step, represented by block 204, is receiving product parameters (e.g., dimensions) for a solid wood product through the front-end interface controlled by the SWPJ system. Next, as represented by block 206, the SWPJ system creates a cut-list and/or BOM using the template workbook. The SWPJ system also communicates the cut-list and/or BOM to a manufacturing control system (such as the system described in U.S. patent application Ser. No. 13/972,802, titled "Mould Manufacturing Control System", filed Aug. 21, 2013, which is incorporated herein in its entirety by reference). Next, as represented by block 208, the SWPJ system writes all necessary machine code (e.g., G-code) programs for machining the components (including all parametric joints) of the solid wood product(s) using the template workbook, the library of design code instructions/functions, and/or the grid. Finally, as represented by block 210, the SWPJ system communicates the machine code to the appropriate production machine(s) (e.g., a 5-axis router).

Referring now to FIG. 2B, a flowchart illustrates a method 200B for production of solid wood products according to embodiments of the invention. The first step, represented by block 212, is receiving, at a chop-saw, BOM instructions from the manufacturing control system and performing cuts. The next step, represented by block 214, is preparing individual (i.e., "clean") staves (wood pieces) for a component using a ripsaw and performing cuts. The next step, represented by block 216 is matching color and/or grain of staves and sorting them into component collections, a step that is typically performed manually. The next step, represented by block 218, is receiving BOM information from the manufacturing control system at a label station of the ripsaw and printing and applying labels for each component. The labels correspond to one or more machine code programs (e.g., G-code program(s) for a 5-axis router). The next product step is to glue-up the components, where the label remains accessible, as represented by block 220. The next step, represented by block 222 is to sand the glued-up components, where the label remains accessible. Steps 220 and 222 are typically performed manually. Next, as represented by block 224, the label is scanned, thereby activating corresponding one or more machine code programs (e.g., activating the G-code program on the 5-axis router). Finally, as represented by block 226, the last step of production is to process the component by the machine (e.g., using the 5-axis router) using the activated machine code program(s) (e.g., G-code program(s)).

Referring now to FIG. 2C, a flowchart illustrates a method 250A for generating a furniture plan according to embodiments of the invention. As shown in block 252, the process flow includes initiating a presentation of a first user interface on a user device associated with a user, the first user interface comprising one or more furniture products (i.e., furniture categories) to be manufactured. In this regard, the first user interface may reflect a catalog of products available for manufacture and/or purchase. By way of example, furniture products include, but are not limited to, hutch, cabinet, entertainment center, desk, or the like. These furniture products or categories may be represented, for example, by the tabs 510 as shown in FIG. 5A.

In response, the process flow includes receiving using the first user interface, a user selection of at least one of the one or more furniture products, as shown in block 254. As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. In some embodiments, the graphical user interface may include both graphical elements and text elements.

In some embodiments, each furniture product may include a plurality of furniture product types, which may be represented by icons, such as icons 520 as shown in FIG. 5A. For example, a chair may include a plurality of chair types such as a side chair, an arm chair, a ladder back, a rocking chair, or the like. In this regard, the process flow includes initiating a presentation of a second user interface on the user device associated with the user based on at least the user selection of at least one of the one or more furniture products, the second user interface comprising one or more furniture product types associated with the at least one of the one or more furniture products selected by the user, as shown in block 256. In response, the system may be configured to receive using the second user interface, a user selection of at least one of the one or more furniture product types, as shown in block 258. In some embodiments, the system may be configured to enable the user to select a plurality of furniture product types simultaneously. In some other embodiments, the system may be configured to enable the user to select each furniture product type individually.

Next, as shown in block 260, the process flow includes initiating a presentation of a third user interface on the user device associated with the user based on at least the user selection of at least one of the one or more furniture product types. In some embodiments, the third user interface includes one or more variables, wherein the one or more variables are associated with one or more components of the one or more furniture product types selected by the user. In one aspect, the one or more variables define one or more attributes for the one or more components. In some embodiments, the one or more components may include a furniture part. By way of example, a furniture product such as a hutch may include one or more components such as a drawer, a shelf, glass cabinet door, legs, or the like. In some other embodiments, the one or more components may include one or more component types. By way of example, for a component such as a chair leg, one or more component types may include a cabriole leg, a fluted leg, spider leg, spiral leg, or the like. In one aspect, the one or more attributes associated with the one or more components may include the dimensions of the components.

Next, as shown in block 262, the process flow includes receiving a user input associated with the one or more variables for each of the one or more components and/or the one or more component types. In this regard, the system may be configured to enable the user to enter dimension values for each of the one or more attributes associated with the one or more variables. In response to receiving the dimension values, the process flow includes generating a furniture plan for the one or more components associated with the at least one of the one or more furniture product types based on at least the received user input, as shown in block 264. In response to generating the furniture plan, the system may be configured to transmit control signals based on the furniture plan to cause a production device to implement the furniture plan, wherein implementing the furniture plan further comprises manufacturing the one or more components.

Referring now to FIG. 2D, a flowchart illustrates a method 250B for determining a relationship between one or more attributes associated with the one or more components according to embodiments of the invention. As shown in block 270, the process flow includes retrieving information associated with the one or more furniture product types, wherein retrieving further comprises accessing a template associated with the user selection of the at least one furniture product type. Typically, the template may include a pre-developed layout of each of the one or more furniture product type and/or the one or more furniture products. In this regard, the template may include information associated with the one or more components and one or more attributes associated with the one or more components. For example, template for a cabinet may include one or more cabinet parts, one or more joints used in the construction of the cabinet, wood species used, a preferred finish, or the like.

In some embodiments, the template may include information associated with one or more sub-components and the placement, type, and/or dimension of the one or more sub-components. By way of example, the one or more sub-components may include dowels, nails, screws, or similar fasteners on the one or more components, one or more furniture parts, and/or the furniture product. By way of another example, the one or more sub-components may include one or more parametric joints, type of tools used in the manufacturing of the one or more components, one or more furniture parts, and/or the furniture product and the corresponding types of indentations (e.g., cuts, holes, or the like) made by the tools.

In some embodiments, the template includes parametric joint information associated with one or more parametric joints, the one or more parametric joints associated with the one or more components, and one or more variables associated with the one or more parametric joints.

Next, as shown in block 272, the process flow includes determining a functional relationship between each of the one or more attributes associated with the one or more components. In some embodiments, determining the relationship further includes determining a ratio of each of the one or more attributes relative to each other. In this regard, the ratio of each of the one or more attributes relative to each other may be specific to each furniture product. For example, the dimension of a traditional buffet is typically 34"×50"×20". In this case, the relationship between each of the attributes is the ratio, 1.7:2.5:1. Next, as shown in block 274, the process flow includes receiving the user input associated with the one or more variables for each of the one or more components. In one aspect, the one or more variables include one or more attributes for the one or more components. In certain cases, a customer may require a custom buffet made that caters to a specific dimension different from the traditional dimension. This may be due to a number of reasons such as availability of space. In this regard, the system may then be configured to receive user input (e.g., dimension values) associated with each of the one or more attributes for the one or more components of the buffet. In one aspect, the one or more components of the buffet may include buffet legs, drawers, cabinet doors, or the like.

In response to receiving the user input, the process flow then includes calculating a value for each of the one or more attributes based on at least the user input and the relationship between each of the one or more attributes associated with the one or more components, as shown in block 276. In this regard, the system may receive the user input and determine the dimensions of each of the one or more components based on the ratio (e.g., 1.7:2.5:1) of the buffet. In some embodiments, in addition to satisfying the relationship between each of the one or more attributes associated with the one or more components, the system may be configured to satisfy one or more generalized ratios, or it may be configured to satisfy relationships outside of the traditional linear ratio for design.

Toolbox Process Flow

Referring now to FIG. 4, a flowchart illustrates a method 400 for adding one or more sub-components to a furniture product template according to embodiments of the invention. As used herein, a sub-component refers to a design tool as described above.

In an exemplary embodiment, the toolbox is a graphical user interface enabling the user to interact with the manufacturing process using graphical icons and visual indicators. As shown in block 402, the process flow includes initiating a presentation of a tool box comprising one or more sub-components. Typically, the one or more sub-components are any additional elements used in the manufacturing process of the furniture product. As described herein, examples of sub-components include, but are not limited to, indentations (cuts, holes, or the like), types of tools (e.g., router), types of indentation made by the tools (e.g., rabbet, trim, angular, or the like), or the like.

Next, at block 404, the process flow includes receiving a user selection of at least one of the one or more sub-components from the toolbox. In some embodiments, wherein receiving a user selection further comprises receiving additional information associated with the user selection. In one aspect, the additional information may include, but is not limited to, placement information. The placement information may be used to determine where the selected sub-component is to be placed on the one or more components, furniture parts, and/or the furniture product.

Next at block 406, the process flow includes retrieving the at least one of the one or more sub-components from the toolbox to be added to the template. In some embodiments, retrieving the one or more sub-components further comprises receiving a user input associated with the retrieved sub-components, wherein the user input comprises values for the variables, wherein the variables define one or more attributes for the selected sub-components. In response, the process flow includes adding the retrieved one or more sub-components to the template, as shown in block 408.

In some embodiments, the system may be configured to convert the generated furniture plan into a production format to be transmitted to the manufacturing device, wherein the production format comprises G-code. In one aspect, the system may be configured to convert the generated furniture plan into a production format automatically.

In some other embodiments, the system may be configured to convert the generated furniture plan into a schematic diagram comprising components associated with the furniture product type selected by the user, wherein the schematic diagram comprises a computer aided diagram. In doing so, the customer may preview the product prior to transmitting the furniture plan for manufacturing and implement last minute changes to the furniture plan.

In some embodiments the system may be configured to receive one or more manufactured components from the manufacturing device, wherein the components manufactured based on at least the furniture plan. In response, the system may be configured to facilitate assembly of the at least one of the one or more furniture parts based on at least the one or more manufactured components.

Details of Computing Systems

Referring now to FIG. 3, illustrates a system environment for optimizing the execution of parametric joinery for solid wood products according to embodiments of the invention. The user computing device 308 may be or include a designer computing system, vendor computing system or customer/other user computing system, and therefore, may represented none, some or all of the back-end system and/or the front-end system both described above. The manufacturing application server 306 may be or include the SWPJ system 100, a manufacturing control system as discussed above and/or others.

As illustrated in FIG. 3, the manufacturing application server 306 is operatively coupled, via a network 301, to the production device 304, and to the user computing device 308. For purposes for the invention, a production device and manufacturing device may be used interchangeably. It should be noted that the production device may include one or more production devices, such as mechanical devices, machinery and the like (e.g., a 5-axis router). It should be further noted that the terms "user computing device" and "user computing system" may be used interchangeably throughout the specification. In this way, the application server 306 can send information to and receive information from the production device 304 and the user computing device 308 to effectively manage the manufacturing process.

Communication between the application server 306 and the production device 304 may be established in various ways. In one specific embodiment of the system, initiating a connection for communication between the production device 304 and other system components may be executed using three software components or modules. A first software component may be associated with the production device 304 such that the software is stored in the memory device 316 and executed by the processing device 314. A second software component may be associated with the application server such that the software is stored in the memory device 350 and executed by the processing device 348.

In one embodiment, establishing a connection for communication may comprise establishing a socket connection. The production device 304 may establish a socket connection with one or more software components stored on the application server 306 by initiating a request for a connection. Upon retrieval of the request, the second software component may create an instance to the data such that the application server 306 boots an instance of a third software component associated with the production device 304 server. To this extent, the production device 304 and application server 306 may establish a client server connection. For example, when the production device 304 wishes to establish a connection, the first software component may send a first character string to the second software component. The first character string may be any alphanumeric combination which requests a new connection between two communication devices. In response to receiving the first character string the second software component may then boot an instance of an executable server file. In one embodiment, the executable server file may exist in the same folder as the second software component. Once the third software component is booted successfully with a connection to the database, it may send its current port setting to the second software component.

Miscellaneous instructions may be sent to and received from the application server 306. Miscellaneous instructions sent to the application server 306 may include, but is not limited to, package printing instruction, package identification instructions, label design information, and machine identification information. Miscellaneous instructions received from the application server 306 may include instructions to provide a display message. The instructions may also be accompanied with an associated port number. It should be noted that, in addition to communicating with the application server 306, production devices 304 may also communicate directly with one or more additional production devices and the user computing device 308. In one embodiment, the application server 306 can send order and/or job information to and receive information from a plurality of production devices 304. As such, the application server 306 may function as a central communication point for managing the furniture product manufacturing process. For example, the application server 306 may receive a plurality of orders and may communicate instructions, associated with processing the order, to the production devices 304. FIG. 3 illustrates only one example of an embodiment of a system environment 300, and it will be appreciated that in other embodiments, one or more of the systems, devices, or servers may be combined into a single system, device, or server, or be made up of multiple systems, devices, or servers.

The network 301 may be a global area network (GAN), such as the Internet, a wide area network (WAN), a local area network (LAN), or any other type of network or combination of networks. The network 301 may provide for wireline, wireless, or a combination of wireline and wireless communication between devices on the network. One or more orders may be made by a plurality of customers online or offline, over the phone, at a merchant's place of business and/or by other transaction means such that the orders are received at the application server 306 and displayed on the user computing device 308. The order may be made by a customer using a computing device or mobile computing device (i.e. smart phone, PDA, or the like) or other types of systems that communicate with the application server 306 to allow the manufacturer to receive and process an order. In other embodiments, the user may access an order stored on the application server 306 and make changes to the order using the user computing device 308 such that the changes are saved in the application server 306 and the updated order information is simultaneously communicated to the production devices 304.

As illustrated in FIG. 3, the application server 306 generally comprises a communication device 346, a processing device 348, and a memory device 350. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 348 is operatively coupled to the communication device 346 and the memory device 350. The processing device 348 uses the communication device 346 to communicate with the network 301 and other devices on the network 301, such as, but not limited to the user computing device 308 and the production device(s) 304. As such, the communication device 346 generally comprises a modem, server, or other device for communicating with other devices on the network 301.

As further illustrated in FIG. 3, the application server 306 comprises computer-readable instructions 354 stored in the memory device 350, which in one embodiment includes the computer-readable instructions 354 of an application 358. In some embodiments, the memory device 350 includes data storage 352 for storing data related to customer orders and/or manufacturing information including but not limited to data created and/or used by the application 358 or the user. The data storage 352 may also store real-time update information for production device(s), manufacturer inventory, order history, production statistics and the like.

In the embodiment illustrated in FIG. 3 and described throughout much of this specification, the manufacturing control application 358 allows the user to interact with the system. First, manufacturing control application 358 allows a user to interact with the customer orders and manage the production process, via the production device 304. Next, the application 358 allows the user to receive real-time updates related to the status of a job and/or a plurality or orders. Both sending and receiving job and/or order information may be performed by a using an interface, such as a user interface associated with production device 304 or user computing device 308, provided from the application 358 via a network 301.

In some embodiments, the manufacturing control application 358 allows the user to communicate with the production device 304, to indicate manual changes in the production process. This communication may be in the form of text communications, voice communications, or the like. Typically, the production process is controlled by instructions created via the application server 306, but in some instances the user may interject and manually alter the production process. The manufacturing control application 358 may receive manufacturing information related to a job via the user computing device 308. The user may also use the user computing device 308 to query the real-time status of an order and/or job.

The jobs may be associated with one or more customer orders. This is largely due to the high efficiency that is yielded when grouping one or more orders for production. In this way, the orders are produced as a single job versus individually. In a specific embodiment, the order may be grouped based on like species.

The user, through the user computing device 308, may provide the manufacturing control application 358 data with respect to product manufacturing. The manufacturing control application 358 may then store the data related to the user input such as, but not limited to order cancellations, order amendments, or the like In this way, the manufacturing control application 358 may have access to all real-time information being received by the user. In an instance that the priority rank has been changed the manufacturing control application 358 may queue updated instructions to be sent to the production devices 304. In one embodiment, the manufacturing control application 358 may detect a favorable combination of order component that will further optimize the production in light of the updated instructions.

The manufacturing control application 358 may also receive data from the user computing device 308. The manufacturing control application 358 may determine an optimal production plan for manufacturing the plurality of orders. The data stored within the manufacturing control application 358 provides computer readable instructions 354 to the processing device 348 to allow for the production of a plurality of jobs associated with one or more orders received by multiple customers. The manufacturing control application 358 stores statistics related to successful job executions as well as statistics related to the efficiency of the overall system.

As illustrated in FIG. 3, the user computing device 308 generally comprises a reader device 335, a communication device 336, a processing device 338, and a memory device 340. The reader device 335 is operatively coupled to the processing device 338, communication device 336, and the memory device 340. The user computing device 308 may include a reader device 335 to receive order information from the user. Such a reader device 335 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reader device 335 receives information that may be used to manage the overall production process and communicates the information via the communication device 336 over a network 301, to other systems such as, but not limited to the application server 306 and/or the production device(s) 304. As such, the communication device 336 generally comprises a modem, server, or other device for communicating with other devices on the network 301.

As further illustrated in FIG. 3, the user computing device 308 comprises computer-readable instructions 342 stored in the memory device 340, which in one embodiment includes the computer-readable instructions 342 of a user application 344. A user computing device 308 may refer to any device used to interact with the application server 306, either from the manufacturer's perspective and/or a customer's perspective. In some embodiments, the user computing device 308 may refer only to a user's device, in other embodiments it refers only to a plurality or user devices, and in yet other embodiments, it refers to both a user device interacting with other devices to perform a job. For example, in one embodiment, the user computing device 308 refers to the user computing device configured to communicate with a production device 304, whereas in other embodiments, the user computing device 308 refers to the production device 304 configured to communicate with a user computing device 308, and in yet other embodiments, the user computing device 308 refers to both the user computing device and the production device(s) 304 configured to communicate with each other to carry out a job. In one embodiment, the user computing device 308 may be a kiosk or special terminal for managing orders.

In some embodiments, a user computing device 308 is or includes an interactive computer terminal that is configured to initiate, complete, and/or facilitate one or more real-time order activations. A user computing device 308 could be or include any device that a user may use to interact with the application server 306, such as, but not limited to, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), and/or various combinations of the foregoing.

In some embodiments, a user computing device 308 is operated in a manufacturing warehouse. In other embodiment, the user computing device 308 may be operated remotely such that the user computing device 308 is not located in the manufacturing facility. In accordance with some embodiments, the user computing device 308 is not owned by the manufacturer. Rather, in some embodiments, the user computing device 308 is owned by a manufacturing company. In yet other embodiments, the user computing device 308 is owned by a third party providing functionality to facilitate and manage a manufacturing process in accordance with embodiments of the invention described herein.

In the embodiment illustrated in FIG. 3, the user application 344 allows the user computing device 308 to be linked to the application server 306 to communicate, via a network 301. Information related to the order being made, such as the customer name, quoted cost of the order, product, quantity, sizes, species and the like may be displayed on the user computing device 308. The user application 344 may provide the manufacturing control application 358 with user input related to the manufacturing process, such that the manufacturing control application 358 may determine an optimal plan for manufacturing a plurality of orders.

The user application 344 may also receive information from the application server 306. The user application 344, in some embodiments, may receive an order from the manufacturing control application 358, such that they user application 344 may display the order to the user on a display on the user computing device 308. In this way, the user may receive an option to alter an order that the system is already in the process of manufacturing. The order may be displayed on the user computing device 308 such that the user may make changes to the order in real-time as the order is being produced.

FIG. 3 also illustrates a production device 304. The production device 304 may include a communication device 312, a processing device 314, and a memory device 316. The processing device 314 is operatively coupled to the communication device 312 and the memory device 316. The processing device 314 uses the communication device 312 to communicate with the network 301 and other devices on the network 301, such as, but not limited to the user computing device 308, the application server 306. As such, the communication device 312 generally comprises a modem, server, or other device for communicating with other devices on the network 301.

As further illustrated in FIG. 3, the production device 304 may include computer-readable instructions 320 stored in the memory device 316, which in one embodiment includes the computer-readable instructions 320 of a device application 322. A production device 304 may be or include any mechanical device and/or machinery including, but not limited to moulder(s), routers, cross cut saws, rip cut saws, coping machines, forklifts, or the like (e.g., a 5-axis router).

Screenshots of the Designer Interface (Back-End Interface) and the User Interface (Front-End Interface)

Referring now to FIG. 5A, a standard Visual Browser user interface 500A is shown according to embodiments of the invention. Referring now to FIG. 5B, a carousel Visual Browser user interface 500B is shown according to embodiments of the invention. Both the standard Visual Browser user interface 500A and the carousel Visual Browser user interface enable a user to navigate to a well-organized catalog to select a desired product to customize and possibly order.

Referring now to FIG. 6, a Product Order Form user interface 600 is shown according to embodiments of the invention. The Product Order Form user interface 600 enables a user to input specific variables indicating how the desired product should be built and details necessary for the order (e.g., quantity, dimensions, species, etc.).

Referring now to FIG. 7, a Toolbox user interface 700 is shown according to embodiments of the invention. The Toolbox user interface 700 enables a designer to select a design tool (i.e., a sub-component) for inclusion in a template, being constructed in the BOM worksheet of the SWPJ system. The design tool enables the SWPJ system to interpret the template and generate machine code as discussed above.

Referring now to FIG. 8, an exemplary screenshot of a workbook with the BOM worksheet 800 selected is shown according to embodiments of the invention.

Referring now to FIG. 9, a Label Design user interface 900 is shown according to embodiments of the invention. The Label Design user interface 900 enables a user to create identifiable parts (e.g., pieces, components, products, etc.) in a particular style inclusive of any and all variables extracted from the template.

Dove-Tail Drawer Box Example

The SWPJ system may utilize interpretive instructions that make the designer/vendor/customer's work much easier. For example, a dove-tail drawer box may only require 4-5 lines of "code" in a template (of the BOM worksheet 160 as shown in FIG. 1C). The SWPJ system enables a user to select any size dove-tail drawer box and the system makes necessary calculations to create the box in real-time. A dove-tail joint has a number of "knuckles" along the edges of the pieces that couple with one another to form the joint. The knuckles at the ends of the edges must be cut so that they are not too narrow, because if the partial knuckle on the end of the edge is too narrow it will break off when the box is assembled. Thus, the SWPJ system, using the template for the dove-tail drawer box and the customer's desired box dimensions, calculates the appropriate knuckle width and geometry of the knuckles in order to ensure the knuckles are spaced such that the end of edge partial knuckles are not too narrow. The system then plots the geometry of the knuckles times the number of knuckles and generates the machine code necessary to create the components of the box. If custom dove-tail drawer boxes were desired historically, a designer must manually design each one individually, performing any necessary calculations and geometric relationships for the knuckles. The designer would have to write the G-code for each custom box.

As illustrated by this example, the SWPJ system revolutionizes the industry for custom solid wood products, making design and creation of solid wood products more streamlined and affordable.

CONCLUSION

As will be appreciated by one skilled in the art, aspects of the present embodiments of the invention may be embodied as a system, method or computer program product. Thus, embodiments of the present invention are described herein with reference to flowchart illustrations and/or block diagrams of methods, systems, and computer program products. Like numbers refer to like elements throughout. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

The steps and/or actions of a method or algorithm described in connection with the embodiments disclosed herein may be embodied directly in hardware, in a software module executed by a processor, or in a combination of the two. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

If implemented in software, the functions may be stored or transmitted as one or more instructions or code on a computer-readable medium. Computer-readable media includes both computer storage media and communication media including any medium that facilitates transfer of a computer program from one place to another. Any combination of one or more computer readable medium(s) may be utilized. The computer readable medium may be a computer readable signal medium or a computer readable storage medium. A storage medium may be any available media that can be accessed by a computer. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

These computer program instructions may also be stored in a computer-readable medium that can direct a computer or other programmable data processing apparatus to function in a particular manner, such that the instructions stored in the computer readable memory produce an article of manufacture including instruction means which implement the function/act specified in the flowchart and/or block diagram block(s). Program code embodied on a computer readable medium may be transmitted using any appropriate medium, including but not limited to wireless, wireline, optical fiber cable, RF, or the like, or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

According to various embodiments of the invention, a computing device used by a user has a memory device configured to store computer-executable code and a processing device in communication with the memory device. The processing device is configured to execute computer-executable code stored on the memory device to communicate with one or more production interfaces, the one or more production interfaces associated with one or more mechanical devices and/or machinery used in the production process. In some embodiments, it also provides the user with options to activate, change, and/or prioritize orders that have been received. In some embodiments, it also provides the user information regarding the current status of one or more orders. In some embodiments, it also provides the user an option of seamlessly managing the production of one or more jobs associated with a plurality of orders.

According to some embodiments of the invention, a processing device of the computing device is configured to access a plurality of orders stored in the memory device, and analyze each order to determine what is needed to produce the order and how the orders can be combined into one job that will optimize the resources and materials being used. In some such embodiments, the computing device also determines whether multiple orders can be combined into one batch or job.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

Although embodiments of the invention described herein are generally described as involving a manufacturing entity, it will be understood that this invention may involve one or more persons, organizations, businesses, merchants and/or other institutions, services providers or the like that implement one or more steps, one or more processes, and/or one or more portions of one or more of the embodiments described and/or contemplated herein, and/or or one or more steps or processes not described herein.

While the foregoing disclosure discusses illustrative embodiments, it should be noted that various changes and modifications could be made herein without departing from the scope of the described aspects and/or embodiments as defined by the appended claims. Additionally, all or a portion of any embodiment may be utilized with all or a portion of any other embodiment, unless stated otherwise. Furthermore, while certain exemplary embodiments have been described and shown in the accompanying drawings, it is to be understood that such embodiments are merely illustrative of and not restrictive on the broad invention, and that this invention is not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

Although many embodiments of the invention have just been described above, the invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the invention described and/or contemplated herein may be included in any of the other embodiments of the invention described and/or contemplated herein, and/or vice versa. In addition, where possible, any terms expressed in the singular form herein are meant to also include the plural form and/or vice versa, unless explicitly stated otherwise.

What is claimed is:

1. A system for optimizing the execution of parametric joinery, the system comprising:
   one or more memory devices; and
   one or more processing devices operatively coupled to the one or more memory devices, wherein the one or more processing devices are configured to execute computer-readable program code to:
      generate template information based on at least processing input information comprising one or more attributes associated with one or more components associated with a furniture product type, the generating comprising calculating a value for each of one or more variables based on user input and a pre-defined relationship between each of the one or more variables associated with the one or more components;
      convert the generated template information into a production format comprising machine code to be transmitted to a manufacturing device;
      transmit the converted template information to the manufacturing device;
      generate a furniture plan for the one or more components associated with the at least one of the one or more furniture product types based on at least the generated template information; and
      transmit at least one control signal based on the furniture plan to cause the manufacturing device to implement the furniture plan, wherein implementing the furniture plan comprises manufacturing the one or more components.

2. The system of claim 1, wherein the computer-readable program code is further configured to cause the at least one processing device to:
   initiate a presentation of a first user interface on a user device associated with a user, the first user interface comprising a one or more furniture products to be manufactured;
   receive, using the first user interface, a user selection of at least one of the one or more furniture products;
   initiate a presentation of a second user interface on the user device associated with the user based on at least the user selection of at least one of the one or more furniture products, the second user interface comprising one or more furniture product types associated with the at least one of the one or more furniture products selected by the user;
   receive, using the second user interface, a user selection of at least one of the one or more furniture product types; and
   initiate a presentation of a third user interface on the user device associated with the user based on at least the user selection of at least one of the one or more furniture product types, the third user interface comprises one or more variables, wherein the one or more variables are associated with one or more components of the at least one of the one or more furniture product types selected by the user, whereby the one or more variables define one or more attributes for the one or more components.

3. The system of claim 1, wherein generating the furniture plan further comprises generating a schematic diagram of the one or more components associated with the at least one of the one or more furniture product types selected by the user, wherein the schematic diagram comprises a computer aided diagram.

4. The system of claim 1, wherein the computer-readable program code is further configured to cause the one or more processing devices to:
   generate a template for each of the one or more furniture product types, wherein the template comprises one or more components associated with the one or more furniture product types and one or more sub-components associated with the one or more components, wherein each of the one or more sub-components comprises one or more attributes.

5. The system of claim 4, wherein the computer-readable program code is further configured to cause the one or more processing devices to:
   initiate a presentation of a tool box comprising one or more sub-components and one or more parametric joints;
   receive a user selection of at least one of the one or more sub-components and/or one or more parametric joints from the toolbox;
   retrieve the at least one of the one or more sub-components and/or one or more parametric joints from the toolbox to be added to the template; and
   add the retrieved one or more sub-components and/or the one or more parametric joints to the template, wherein adding the retrieved one or more sub-components and/or the one or more parametric joints further comprises receiving a user input for the one or more attributes for one or more variables associated with the one or more sub-components.

6. The system of claim 1, wherein the computer-readable program code is further configured to cause the one or more processing devices to:
   receive one or more manufactured components from the manufacturing device, the components manufactured based on at least the furniture plan; and
   facilitate assembly of the at least one of the one or more furniture parts based on at least the one or more manufactured components.

7. The system of claim 1, wherein the machine code comprises G-code.

8. The system of claim 1, wherein the machine code is configured to control, at least in part, the manufacturing device.

9. The system of claim 8, wherein the manufacturing device is a five (5)-axis router.

10. The system of claim 8, wherein the machine code comprises second machine code configured to control, at least in part, a second manufacturing device.

11. A method for optimizing the execution of parametric joinery, the method comprising:
    generating template information based on input information comprising one or more attributes associated with one or more components associated with a furniture product type, the generating comprising calculating a value for each of the one or more variables based on at least the user input and the relationship between each of the one or more variables associated with the one or more components;
    converting the generated template information into a production format comprising machine code to be transmitted to a manufacturing device;
    transmitting the converted template information to the manufacturing device;

generating a furniture plan for the one or more components associated with the at least one of the one or more furniture product types based on at least the generated template information; and transmitting at least one control signal based on the furniture plan to cause the manufacturing device to implement the furniture plan, wherein implementing the furniture plan comprises manufacturing the one or more components.

12. The method of claim 11, further comprising:

initiating a presentation of a first user interface on a user device associated with a user, the first user interface comprising a one or more furniture products to be manufactured;

receiving, using the first user interface, a user selection of at least one of the one or more furniture products;

initiating a presentation of a second user interface on the user device associated with the user based on at least the user selection of at least one of the one or more furniture products, the second user interface comprising one or more furniture product types associated with the at least one of the one or more furniture products selected by the user;

receiving, using the second user interface, a user selection of at least one of the one or more furniture product types; and initiating a presentation of a third user interface on the user device associated with the user based on at least the user selection of at least one of the one or more furniture product types, the third user interface comprises one or more variables, wherein the one or more variables are associated with one or more components of the at least one of the one or more furniture product types selected by the user, whereby the one or more variables define one or more attributes for the one or more components.

13. The method of claim 11, wherein generating the furniture plan further comprises generating a schematic diagram of the one or more components associated with the at least one of the one or more furniture product types selected by the user, wherein the schematic diagram comprises a computer aided diagram.

14. The method of claim 11, further comprising:

generating a template for each of the one or more furniture product types, wherein the template comprises one or more components associated with the one or more furniture product types and one or more sub-components associated with the one or more components, wherein each of the one or more sub-components comprises one or more attributes.

15. The method of claim 14, further comprising:

initiating a presentation of a tool box comprising one or more sub-components and one or more parametric joints;

receiving a user selection of at least one of the one or more sub-components and/or one or more parametric joints from the toolbox;

retrieving the at least one of the one or more sub-components and/or one or more parametric joints from the toolbox to be added to the template; and adding the retrieved one or more sub-components and/or the one or more parametric joints to the template, wherein adding the retrieved one or more sub-components and/or the one or more parametric joints further comprises receiving a user input for the one or more attributes for one or more variables associated with the one or more sub-components.

16. The method of claim 14, further comprising:

receiving one or more manufactured components from the manufacturing device, the components manufactured based on at least the furniture plan; and facilitating assembly of the at least one of the one or more furniture parts based on at least the one or more manufactured components.

17. The method of claim 14, wherein the machine code comprises G-code configured to control, at least in part, the manufacturing device.

* * * * *